United States Patent
Yersak et al.

(10) Patent No.: US 11,283,106 B2
(45) Date of Patent: Mar. 22, 2022

(54) LITHIUM ALL-SOLID-STATE BATTERY

(71) Applicant: THE REGENTS OF THE UNIVERSITY OF COLORADO, a body corporate, Denver, CO (US)

(72) Inventors: Thomas A. Yersak, San Diego, CA (US); Se-Hee Lee, Louisville, CO (US); Conrad Stoldt, Golden, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 301 days.

(21) Appl. No.: 16/698,066

(22) Filed: Nov. 27, 2019

(65) Prior Publication Data
US 2020/0099095 A1 Mar. 26, 2020

Related U.S. Application Data

(60) Division of application No. 15/391,442, filed on Dec. 27, 2016, now abandoned, which is a continuation of
(Continued)

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/364* (2013.01); *H01M 4/382* (2013.01);
(Continued)

(58) Field of Classification Search
CPC .. H01M 10/0562; H01M 4/364; H01M 4/382; H01M 4/5815; H01M 10/052; H01M 10/0525; H01M 4/386; H01M 2300/0068
See application file for complete search history.

(56) References Cited

U.S. PATENT DOCUMENTS 3,907,589 A 9/1975 Gay et al.
5,472,808 A * 12/1995 Peled ................ H01M 10/0565
429/312
(Continued)

FOREIGN PATENT DOCUMENTS

EP 0704920 4/1996
EP 0829913 A2 3/1998
(Continued)

OTHER PUBLICATIONS

PCT/US2013/020819 International Preliminary Report on Patentability, dated Jul. 15, 2014, 6 pages.
(Continued)

*Primary Examiner* — Stewart A Fraser
(74) *Attorney, Agent, or Firm* — Polsinelli PC

(57) ABSTRACT

An all-solid-state lithium battery, thermo-electromechanical activation of $Li_2S$ in sulfide based solid state electrolyte with transition metal sulfides, and electromechanical evolution of a bulk-type all-solid-state iron sulfur cathode, are disclosed. An example all-solid-state lithium battery includes a cathode having a transition metal sulfide mixed with elemental sulfur to increase electrical conductivity. In one example method of in-situ electromechanically synthesis of Pyrite ($FeS_2$) from Sulfide (FeS) and elemental sulfur (S) precursors for operation of a solid-state lithium battery, FeS+S composite electrodes are cycled at moderately elevated temperatures.

10 Claims, 21 Drawing Sheets

Related U.S. Application Data application No. 14/371,500, filed as application No. PCT/US2013/020819 on Jan. 9, 2013, now abandoned.

(60) Provisional application No. 61/590,494, filed on Jan. 25, 2012, provisional application No. 61/585,098, filed on Jan. 10, 2012.

(51) Int. Cl.
*H01M 4/58* (2010.01)
*H01M 10/052* (2010.01)
*H01M 10/0525* (2010.01)
*H01M 4/38* (2006.01)

(52) U.S. Cl.
CPC ....... *H01M 4/5815* (2013.01); *H01M 10/052* (2013.01); *H01M 10/0525* (2013.01); *H01M 4/386* (2013.01); *H01M 2300/0068* (2013.01)

(56) References Cited

U.S. PATENT DOCUMENTS

| 6,207,327 | B1 | 3/2001 | Takada et al. | |
|---|---|---|---|---|
| 2010/0273062 | A1 | 10/2010 | Tsuchida et al. | |
| 2011/0037037 | A1* | 2/2011 | Takeuchi | H01M 4/483 252/519.4 |

FOREIGN PATENT DOCUMENTS

| JP | 1994275312 A | 9/1994 |
|---|---|---|
| JP | 2006-164695 A | 6/2006 |
| JP | 2011154900 A | 8/2011 |
| WO | 2009038037 | 3/2009 |

OTHER PUBLICATIONS

PCT/US2013/020819 International Search Report, dated Oct. 24, 2013, 2 pages.

Hayashi, A., et al., Rechargeable lithium batteries, using sulfur-based cathode materials and Li2S—P2S2 glass-ceramic electrolytes, Electrochimica Acta 50 (2004) 893-897.

Office Action dated Apr. 18, 2017 in European Patent Application No. 13757981.9, 9 pp.

Takada K et al: "Solid state batteries with sulfide-based solid electrolytes", Solid State Ionics, North Holland Pub. Company, Amsterdam; NL, NL, vol. 172, No. 1-4, Aug. 31, 2004 (Aug. 31, 2004), pp. 25-30.

English Translation of Office Action dated Feb. 20, 2018 in Japanese Patent Application No. 2017-074126, 4 pp.

Shembel et al. (2004) "Electrolytic Iron Sulfide Products in Lithium Batteries," Russian Journal of Electrochemistry, vol. 40, No. 7, 7 pp.

* cited by examiner

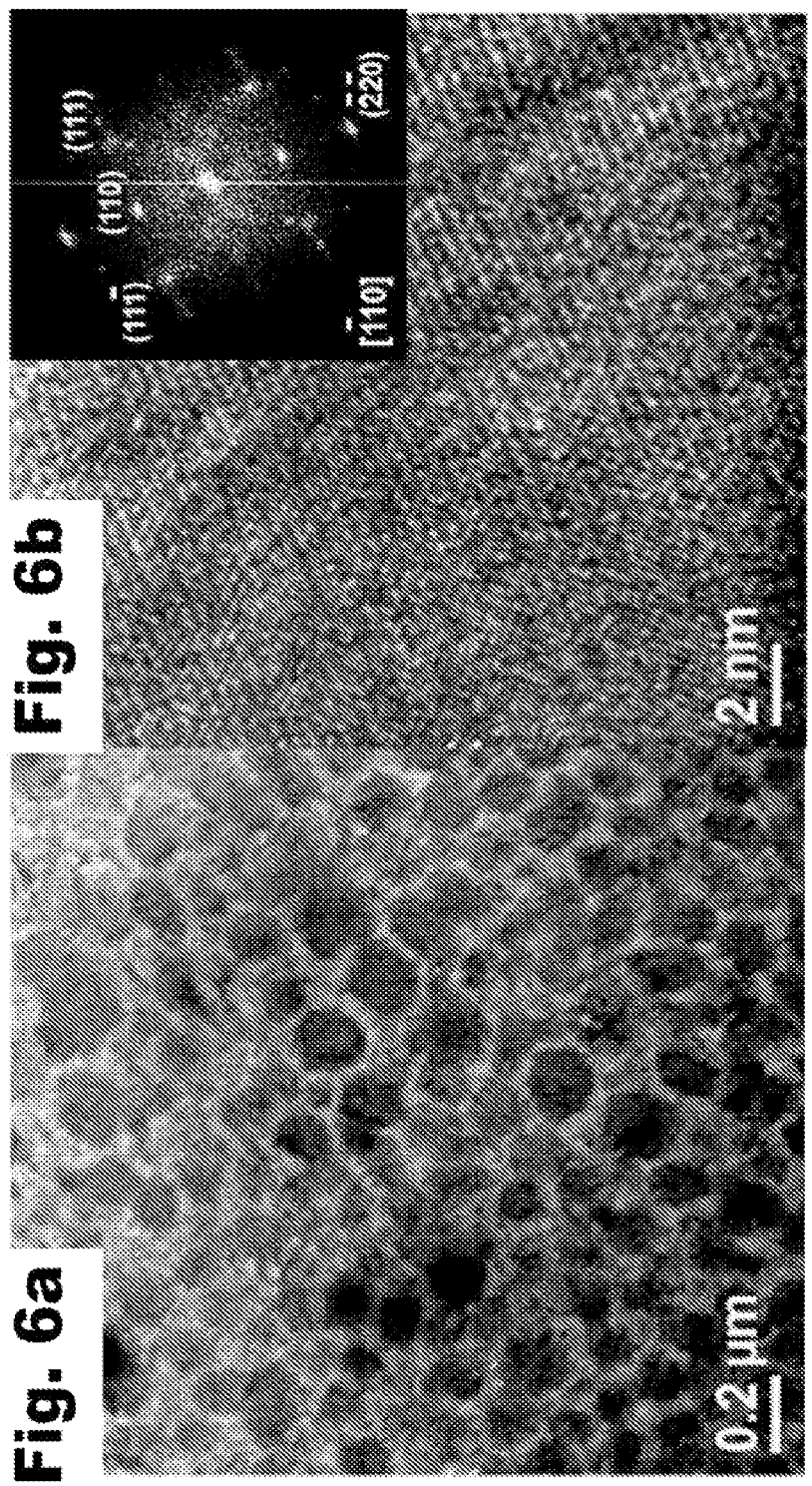

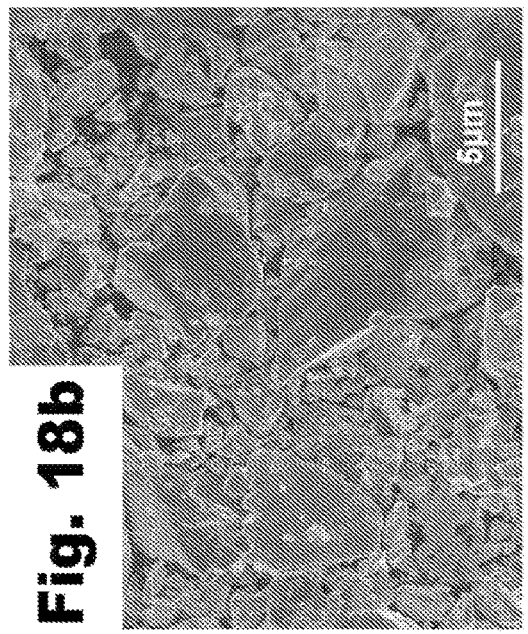
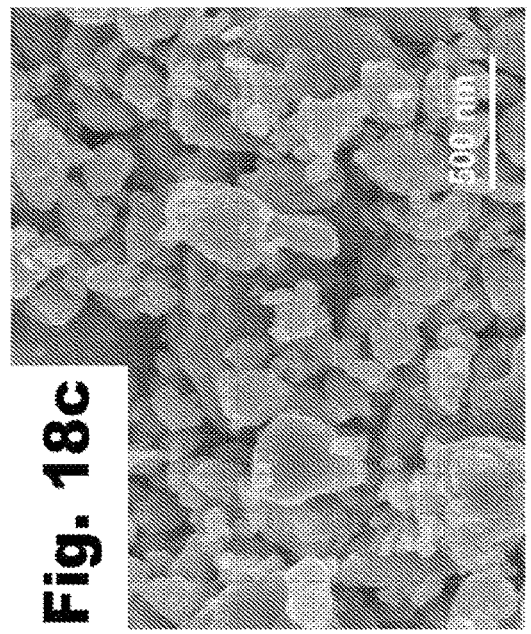
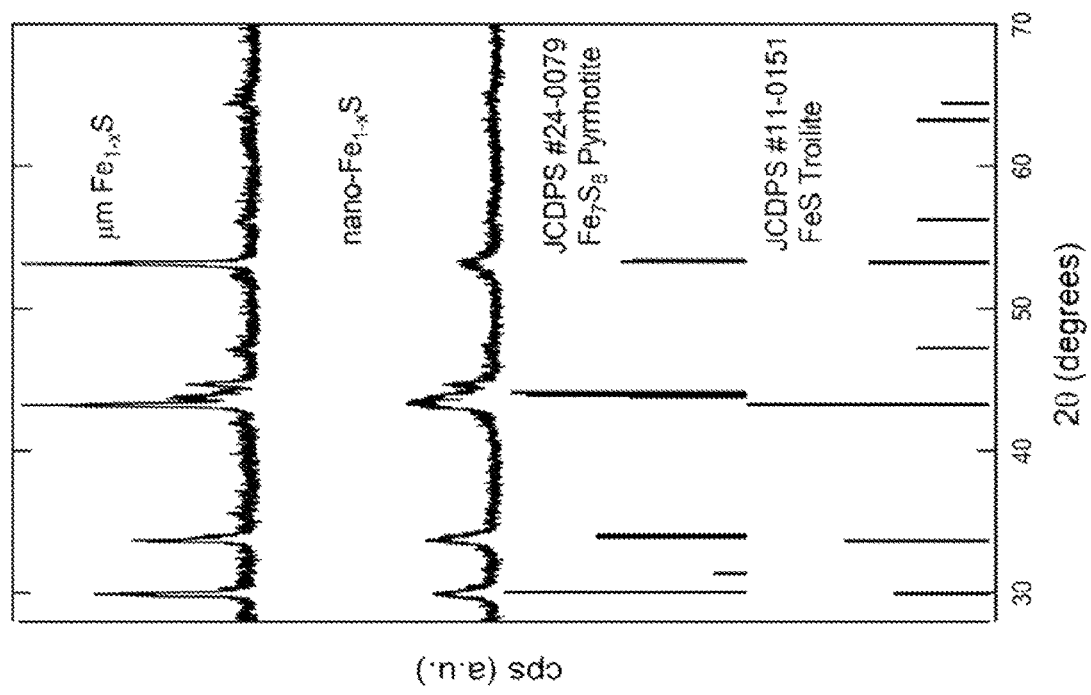

LITHIUM ALL-SOLID-STATE BATTERY

RELATED APPLICATIONS

This application is a division of U.S. application Ser. No. 15/391,442 filed Dec. 27, 2016, which is a continuation of U.S. application Ser. No. 14/371,500 filed Jul. 10, 2014, which is a national stage entry under 35 U.S.C. 371 of International Application No. PCT/US2013/020819 filed Jan. 9, 2013, which claims the benefit of priority to U.S. Provisional Application No. 61/585,098 filed Jan. 10, 2012 and to U.S. Provisional Application No. 61/590,494 filed Jan. 25, 2012. Each of the afore-mentioned application is incorporated herein by reference.

GOVERNMENT RIGHTS

This invention was made with government support under grant number FA8650-08-1-7839 awarded by the Air Force Research Laboratory. The government has certain rights in the invention.

BACKGROUND

Use of traditional rechargeable lithium-ion batteries in consumer products is a concern due to safety issues. Such safety issues include, but are not limited to, solvent leakage and flammability of commercial grade liquid electrolytes. Traditional solid-state batteries (composed of glass ceramic rather than liquid electrolytes) do not pose such safety risks and offer high reliability for end-users. However, traditional solid-state batteries suffer from poor rate capability, low ionic conductivity, interfacial instability, and low loading of active materials.

Molten salt solid-state batteries require high operating temperatures (e.g., 400° C. and higher), so research was abandoned in search of room temperature lithium-ion and lithium-polymer technologies. Iron disulfide has been successfully commercialized in high energy density primary cells. Unfortunately, sulfide conversion chemistries are irreversible at ambient to moderately elevated temperatures, making these unusable for rechargeable batteries.

BRIEF DESCRIPTION OF THE DRAWINGS

FIG. 6*a* shows a bright field transmission electron microscopy (TEM) image of electrode material from the solid-state cell cycled at 60° C. recovered after the twentieth charge for TEM.

FIG. 6*b* shows a high resolution (HR-) TEM image of electrode material from the solid-state cell cycled at 60° C. recovered after the twentieth charge for TEM.

FIG. 18a shows XRD of FeS before and after milling.

FIG. 18b shows an FESEM micrograph of FeS.

FIG. 18c shows an FESEM micrograph of $Fe_{1-x}S$ after mechanical milling.

DETAILED DESCRIPTION

Figure 1:
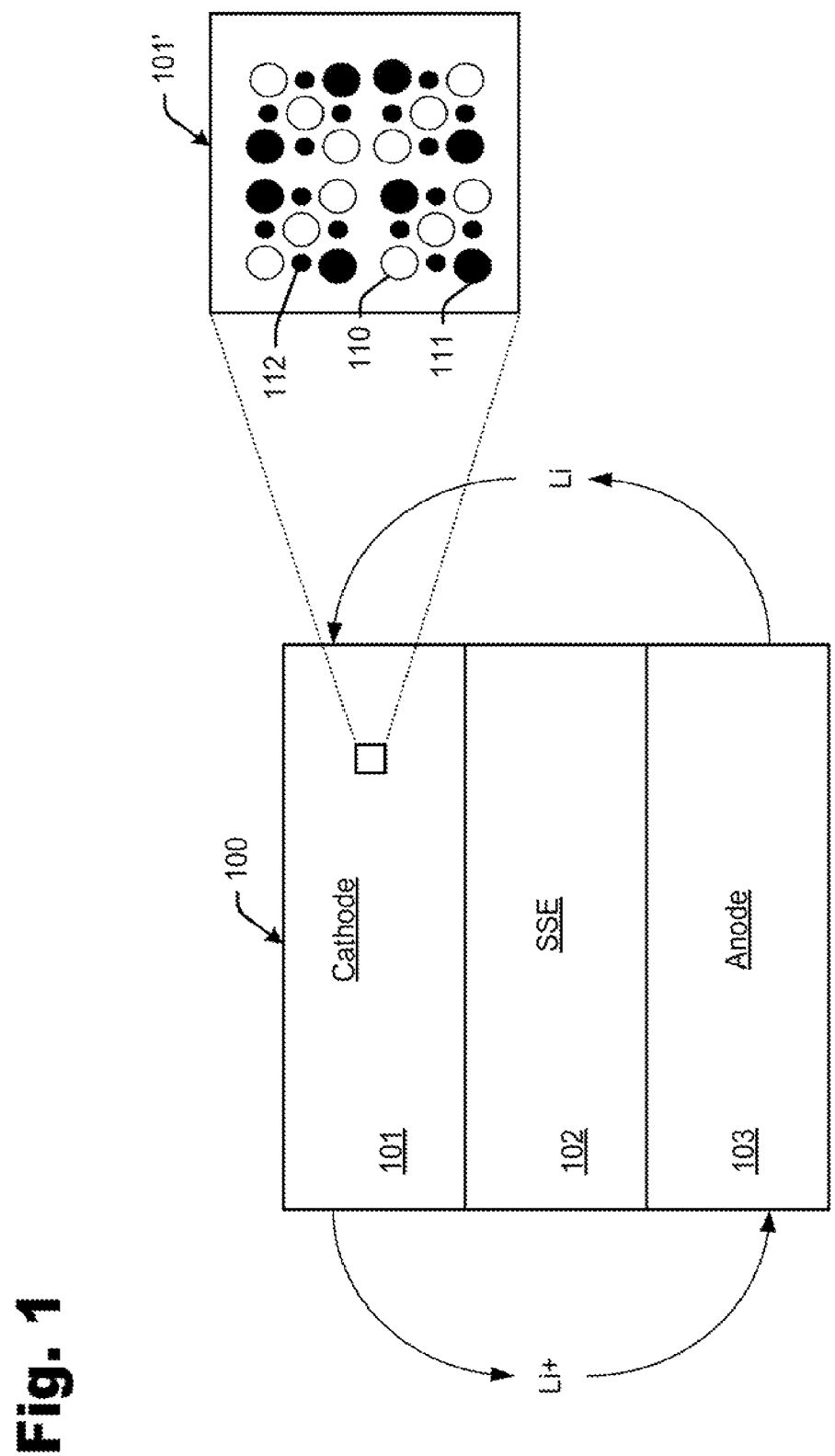
FIG. 1 is a high-level depiction of an example lithium or lithium-ion all-solid-state battery structure.

Many advanced battery technologies are vying to be the successor of today's conventional Li-ion batteries. A strong argument can be made that bulk-type all-solid-state lithium batteries (ASSLB) hold a competitive edge in this technological race because they are inherently safe, have excellent shelf life, perform stably at high temperatures, and enable the reversibility of high capacity conversion battery materials like $FeS_2$. However, the energy density of high power ASSLBs must be improved. The success of the ASSLB architecture can be realized with energy dense all-solid-state composite cathodes.

Examples of an ambient temperature, reversible solid-state cathode are disclosed. An example implementation is in a lithium (Li) metal configuration. The battery may be constructed using a sulfide glass-ceramic solid electrolyte, and is implemented in an all-solid-state cell architecture. In an example, the battery may be characterized as $M_xS_y+zS$ where M=Fe, Co, Mo, y=0, 1, 2, 3 and z=0, ½, 1, and so forth. This nomenclature is intended to include at least the following systems: $FeS_2$, FeS, FeS+S, and may also include other suitable substitutes as will be understood by those having ordinary skill in the art after becoming familiar with the teachings herein. It is noted that the electrochemical synthesis of metal nano-particles maintains the electrochemical activity of $Li_2S$. Accordingly, the battery addresses issues previously associated with rapid capacity fade at ambient temperature. The electrochemically driven synthesis of orthorhombic-$FeS_2$ (marcasite) can be at least partially achieved at ambient temperatures.

The design of an ambient temperature transition metal plus sulfide batteries is based at least in part on management of electro-active species formed upon full charge (2.5V versus Li+/Li) and full discharge (1.0V versus Li+/Li). Two example species are elemental iron($Fe^0$) and polysulfides ($S_n^{2-}$). To reduce or altogether prevent diffusion and agglomeration of $Fe^0$ nanoparticles in conventional cells, a variety of polymer electrolytes have been employed with limited success.

A similar approach may be applied to the confinement of intermediate polysulfides in conventional Li-S batteries. Example methods for addressing intermediate polysulfide dissolution and $Li_2S$ irreversibility include polysulfide adsorption on high surface area CMK-3 nano-porous carbon electrodes, polymer electrolytes, and polyacrylonitrile-surfur composites.

Another approach is to limit the upper and/or lower voltage bounds of the $FeS_2$ cells, for example, to about 2.2V and 1.3V respectively. The formation of $Fe^0$ and $S_n^{2-}$ is inhibited by avoiding full discharge and charge. However, limiting the cell voltage range diminishes achievable energy density and subjects the cells to the risk of over-charge or over-discharge.

The basic nature of an all-solid-state cell architecture allows for the confinement of electro-active species. For example, $FeS_2$ and $Li_2FeS_2$ can both be utilized reversibly as an all-solid-state anode. An all-solid-state architecture reduces or altogether prevents $Fe^0$ dissolution and agglomeration. Sulfide-based, glass-ceramic solid electrolytes and other materials that are stable at elevated temperatures demonstrate higher conductivities at ambient temperatures. Accordingly, lithium metal anodes can be safely used with solid electrolytes because cell failure does not precipitate thermal runaway. A lithium metal electrode has a theoretical capacity of about 3876 mAh $g^{-1}$, is non-polarizable and has a low operating voltage that increases achievable cell energy density. An all-solid-state architecture not only enables the safe use of a lithium metal anode, but also enables the reversible full utilization the cathode material.

Further examples herein disclose in-situ electrochemical formation of high capacity conversion battery materials like $FeS_2$ and reversible utilization of a glass or other stable electrolyte for higher overall electrode energy density. In an example, the best performing composite electrode compositions are composed of no more than about 25% S or $Li_2S$ by weight. Sulfur's high theoretical specific capacity of about 1672 mAh $g^{-1}$ offsets poor active material mass loading so that high overall electrode energy densities can be achieved for ASSLBs. To increase the overall energy density of a composite electrode without changing the composition, the techniques described herein reversibly electrochemically utilize the glass-ceramic electrolyte. For example, by incorporating μm-Cu powder acetylene black, and $80Li_2S:20P_2S_5$ glass-ceramic electrolyte into a composite electrode, the $Li_2S$ component of glass-ceramic electrolyte electrochemical can be utilized. For more effective electrolyte activation and better electrode reversibility, the active metal can be provided by in-situ electrochemical reduction.

The examples described herein may be further optimized by utilizing a mechanochemically prepared active material nano-composite of high capacity conversion battery materials like FeS and S. This material provides an alternative to the expensive solvothermally synthesized cubic-$FeS_2$ (pyrite) based cathode. The precursors (e.g., FeS and S) are comparatively inexpensive and can be obtained in much higher purities than natural pyrite. The mechanical milting process also provides material much more readily than the solvothermal method.

During testing, the rapidly increasing specific capacity of the nano-composite electrode (e.g., FeS+S) quickly exceeded its theoretical capacity by about 94% in testing. The excess capacity is a result of a dramatic utilization of the glass electrolyte in the composite electrode without a degradation of cell performance. At its maximum, an example electrode exhibited an energy density of about 1040 Wh $kg^{-1}$ which is the highest energy density achieved for a bulk-type all-solid-state electrode. With extended cycling, the electrochemistry of the composite electrode (e.g., FeS+S) evolves a redox chemistry based primarily on that of only sulfur. The results show that electrochemically structured interfaces between conversion active materials and the glass electrolyte can be utilized to increase energy density of ASSLBs, while maintaining good rate performance.

It is noted that examples are described herein with respect to specific materials and process parameters for purposes of illustration only, and are not intended to be limiting. Other examples will be understood by those having ordinary skill in the art after becoming familiar with the teachings herein, and are also intended to be included within the scope of the claims.

Before continuing, it is noted that as used herein, the terms "include" and including" mean, but is not limited to, "includes" or "including" and Includes at least" or "including at least." The term "based on" means "based on" and "based at least in part on."

Lithium All-Solid-State Battery

FIG. 1 shows a high-level depiction of a lithium all-solid-state battery structure 100. The battery structure 100 is shown including a cathode 101, solid state electrolyte 102, and an anode 103. The arrows are illustrative of charge and recharge cycles. The anode may include a lithium metal, graphite, silicon, and/or other active materials that transfer electrons during charge/discharge cycles. In an example, the lithium reservoir may be a stabilized Li metal powder.

The cathode 101 is shown in more detail in the exploded view 101', wherein the white circles labeled 110 represent a transition metal sulfide (e.g., $FeS_2$ or a mixture of FeS plus S). The gray circles labeled 111 represent solid state electrolyte (SSE) particles. The SSE particles promote ionic conductive pathways in and out of the cathode 101. The black circles labeled 112 represent a conducting additive, such as acetylene black.

In example, the transition metal sulfide (e.g., FeS plus S) may be mechanically mixed (e.g., using ball milling or other mechanical processes), and are not chemically combined. The chemistry of the cathode approximates $FeS_2$ on the first cycle. After 10 or more charge cycles, the cathode exhibits a behavior that is similar to that of the first cycle.

Although the lithium all-solid-state battery structure 100 may be implemented using any suitable transition metal sulfide plus sulfide combination, the following discusses a specific battery structure based upon synthetic iron disulfide.

Figure 2A:
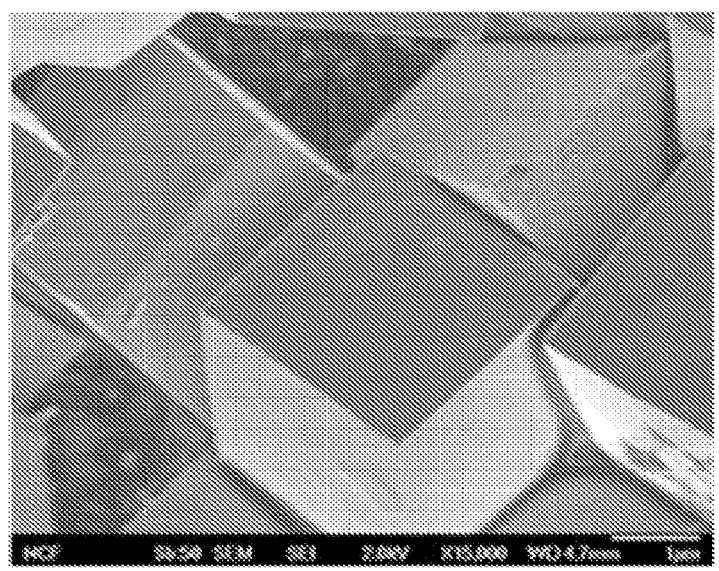
FIG. 2*a* shows for an example battery a field emission scanning electron microscope (FESEM) micrograph of synthetic $FeS_2$ that confirms cubic structure with 2-3 µm cubes.
Figure 2B:
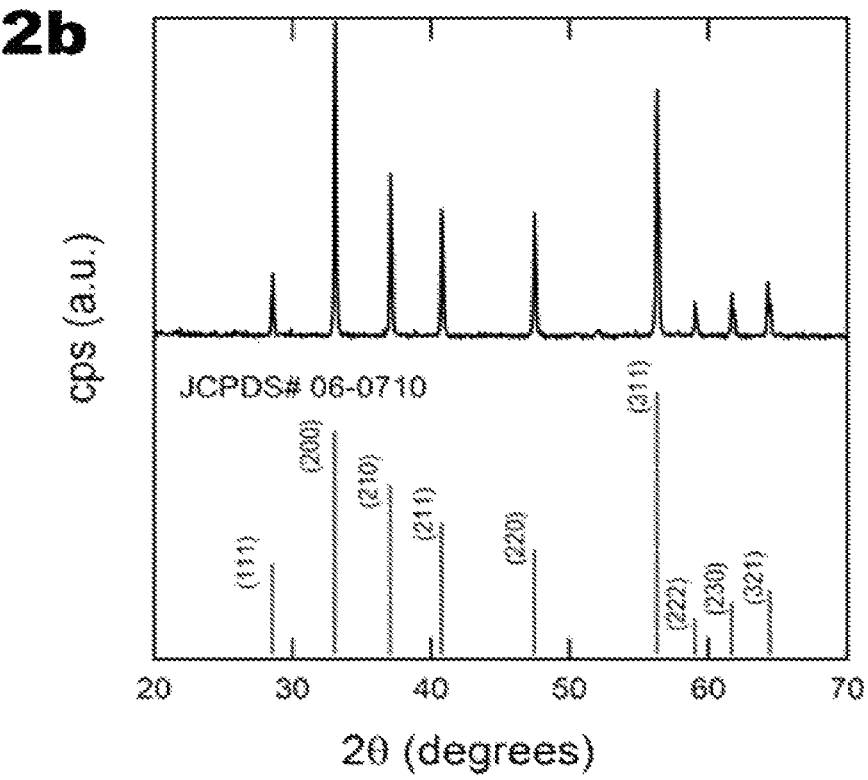
FIG. 2*b* shows for an example battery X-ray diffraction of synthetic pyrite.

Synthetically prepared $FeS_2$ is characterized with Field emission scanning electron microscopy (FESEM) and x-ray analysis. FIG. 2 shows (a) a FESEM micrograph of synthetic $FeS_2$ that confirms cubic structure with wide 2-3 μm cubes, and (b) X-ray diffraction of synthetic pyrite. The FESEM micrograph shown in FIG. 2(a) reveals cubic $FeS_2$ particles with 3 μm wide faces. The X-ray analysis of synthetically prepared $FeS_2$ shown in FIG. 2(b) shows diffraction peaks that match well with indexed peaks.

Synthetic $FeS_2$ was tested in both an all-solid-state and liquid cell configuration. To achieve full utilization of $FeS_2$ the cells are cycled to full discharge (1.0V) and full charge (3.0V). The results of cycling at ambient and moderate temperatures are shown in FIG. 3. For purposes of illustration, FIG. 3 shows $FeS_2$ cycled at ambient temperature (about 30° C.) and moderately elevated temperature (about 60° C.) in a liquid coin cell and in an all-solid-state configuration for: (a) solid-state at 30° C., (b) solid-state at 60° C., (c) liquid coin cell at 30° C., (d) a liquid coin cell at 60° C., (e) capacity retention comparison of cells cycled at 30° C., and (f) capacity retention comparison of cells cycled at 60° C. All cells except for the 30° C. solid-state cell were cycled at a current of 144 μA which corresponds to a rate of C/10 for charge and discharge. The 30° C. solid-state cell was cycled at rate of C/10 for the first cycle and C/20 (72 μA) for all subsequent cycles.

Both solid-state cells are observed to have good capacity retention and a high degree of $FeS_2$ utilization. The gradual increase in capacity with cycling is observed to be a result of better $FeS_2$ utilization. This conclusion is supported by differential capacity (dQ/dV) analysis. By the twentieth cycle, the cell tested at 30° C. exhibits a discharge capacity of nearly 750 mAh while the cell tested at S0° C. exhibits a theoretical discharge capacity of about 894 mAh g$^{-1}$. It is likely that the temperature dependence of solid electrolyte's conductivity contributes to the full $FeS_2$ utilization at 60° C., but not at 30° C. At 60° C. the conductivity of the 77.5Li$_2$S-22.5P$_2$S$_5$ solid electrolyte increases to $4.4\times10^{-3}$ $\Omega^{-1}$ cm$^{-1}$ from $9.17\times10^{-4}$ $\Omega^{-1}$ cm$^{-1}$ at 30° C. In addition, a higher operating temperature increases the Li$^+$ diffusivity in pyrite particles. More efficient Li$^+$ insertion into cubic-$FeS_2$ is also likely to result in better $FeS_2$ utilization.

In liquid cells, the discharge capacity rapidly fades upon cycling. By the twentieth cycle, the liquid cell tested at 30° C. exhibits a discharge capacity of only 190 mAh g$^{-1}$ while the cell tested at 60° C. exhibits no discharge capacity. Decomposition processes are accelerated at 60° C. leading to such a fast rate of capacity fade that negligible capacity is observed after the second cycle. On the other hand, we have just shown that cycling a solid-state $FeS_2$ cell at 60° C. only improves its performance. At 60° C., it is possible to achieve a reversible, four electron utilization of $FeS_2$. It is noted that many traction battery packs are designed to operate at temperatures near about 60° C. The superior performance of all-solid-state batteries described herein at higher temperatures may reduce the need for extensive thermal management systems.

Mossbauer spectroscopy and near-edge X-ray absorption spectroscopy (XANES) show that the products of $FeS_2$ reduction are elemental iron (Fe$^0$) and Li$_2$S. The initial discharge of $FeS_2$ proceeds in two steps:

(1) $FeS_2 + 2Li^+ + 2e^- \leftrightarrows Li_2FeS_2$
(2) 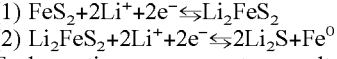

Each reaction can occur at one voltage or two, depending at least in part on the kinetics of the system.

Figure 3A:
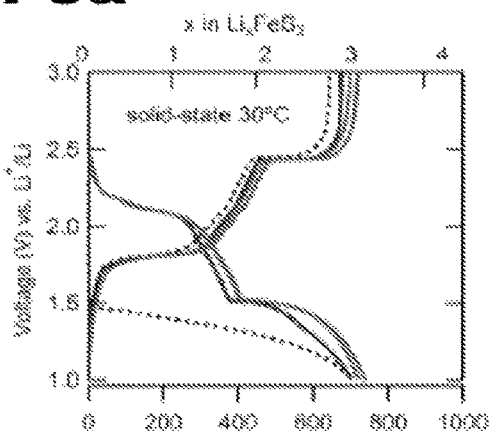
FIG. 3*a* shows as an example of $FeS_2$ cycled at ambient temperature (about 30° C.) and moderately elevated temperature (60° C.) in a liquid coin cell and in an all-solid-state configuration for solid-state at 30° C.
Figure 3B:
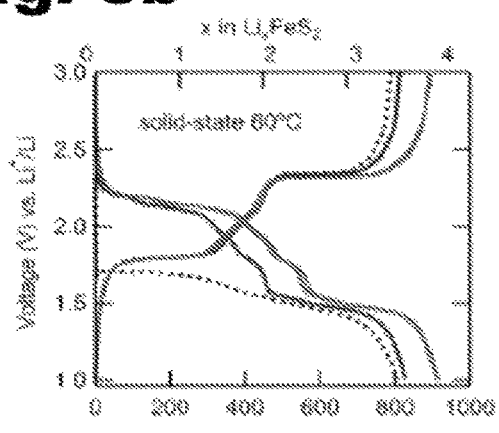
FIG. 3*b* shows as an example of $FeS_2$ cycled at ambient temperature (about 30° C.) and moderately elevated temperature (60° C.) in a liquid coin cell and in an all-solid-state configuration for solid-state at 60° C.
Figure 3C:
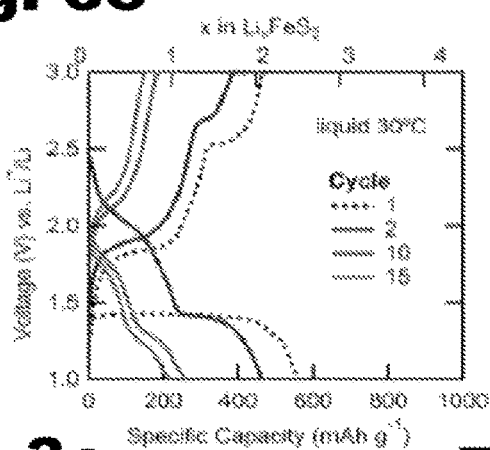
FIG. 3*c* shows as an example of $FeS_2$ cycled at ambient temperature (about 30° C.) and moderately elevated temperature (60° C.) in a liquid coin cell and in an all-solid-state configuration for a liquid coin cell at 30° C.
Figure 3D:
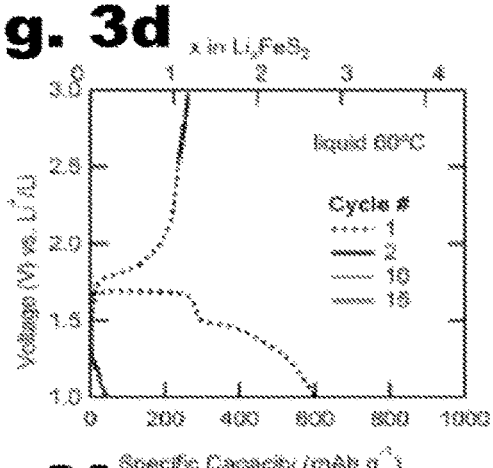
FIG. 3*d* shows as an example of $FeS_2$ cycled at ambient temperature (about 30° C.) and moderately elevated temperature (60° C.) in a liquid coin cell and in an all-solid-state configuration for a liquid coin cell at 60° C.
Figure 3E:
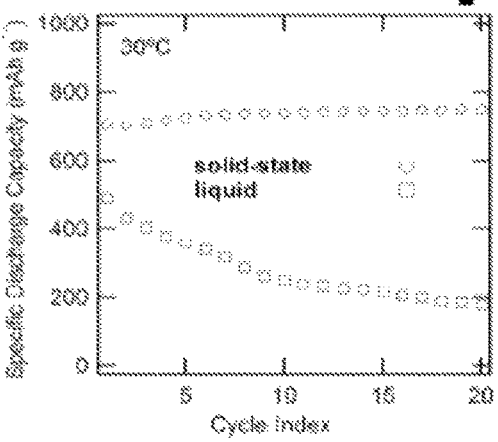
FIG. 3*e* shows as an example of $FeS_2$ cycled at ambient temperature (about 30° C.) and moderately elevated temperature (60° C.) in a liquid coin cell and in an all-solid-state configuration for capacity retention comparison of cells cycled at 30° C.
Figure 3F:
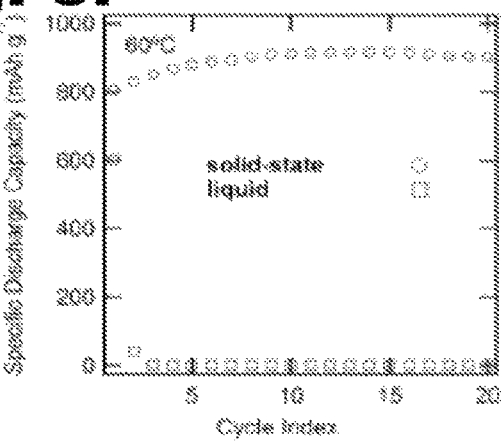
FIG. 3*f* shows as an example of $FeS_2$ cycled at ambient temperature (about 30° C.) and moderately elevated temperature (60° C.) in a liquid coin cell and in an all-solid-state configuration for capacity retention comparison of cells cycled at 60° C.

Discharge profiles were observed having one plateau when the cell is cycled at 30° C., as can be seen in FIGS. 3(a) and (c), and two plateaus at 60° C., as can be seen in FIGS. 3(b) and (d). At lower temperatures the reactions are limited by the Sow diffusivity of Li$^+$ into the micron sized $FeS_2$ particles. At 30° C., reactions corresponding to equations (1) and (2) shown above proceed simultaneously at 1.5V versus Li$^+$/Li. At moderately elevated temperatures, equations (1) and (2) can proceed at 1.7 and 1.5V respectively due to the higher diffusivity of If into the micron sized $FeS_2$ particles. The shoulder at 1.3V in the ambient temperature liquid cell, as can be seen in FIG. 3(c), may be attributed to an irreversible side reaction of $FeS_2$ intermediaries with the organic electrolyte. It is noted that the initial discharge profile of the $FeS_2$ cells is much different than subsequent discharge profiles. The variation in discharge profiles may be due to the improved reaction kinetics of charge products compared to that of cubic-μm$FeS_2$. Better kinetics may be due to changes in $FeS_2$ particle morphology and the electrochemical formation of a different phase of stoichiometric of $FeS_2$ like orthorhombic-$FeS_2$ (marcasite).

Superior performance observed in the solid state is believed to be due to the confinement of electro-active species. The confinement of Fe$^0$ by solid electrolyte partially explains the better performance. Fe$^0$ takes the form of super-paramagnetic atoms or small aggregates of atoms of about 3.6 nm in diameter. Nano-particles of Fe$^0$ have a high reactivity which is related to the nano-particle's large surface area. Should Fe$^0$ particles agglomerate into larger particles with smaller overall surface area, then these particles will have a lower reactivity. Without meaning to be limited by the theory, it may be the high reactivity of the Fe$^0$ nano-particles that maintains the electro-activity of Li$_2$S. Of course, other theories are also possible.

But $Fe^0$ is susceptible to continuous agglomeration upon cycling. Agglomeration of $Fe^0$ results in the isolation of $Li_2S$ species and the observed capacity fade when cells are discharged to low voltages. An all-solid-state architecture can reduce or altogether prevent the agglomeration of $Fe^0$ nana-particles. The atomic proximity of $Fe^0$ nanoparticles with $Li_2S$ maintains the electro-activity of $Li_2S$ without the excessive amount of conductive additive needed in $S/Li_2S$ based batteries.

An all-solid-state architecture is also successful at confining polysulfides $S_n^{2-}$ formed when the electro-active species present at full charge are reduced. At ambient to moderate temperatures, $FeS_2$ is not regenerated by the four electron oxidation of $Fe^0$ and $Li_2S$. But the same is not true for molten salt $FeS_2$ cells, which operate reversibly at temperatures in excess of 400° C.

Generally, subsequent charge and discharge cycles may proceed according to the following reactions:

(3) $Fe^0 + Li_2S \leftrightarrows Li_2FeS_2 + 2Li^+ + 2e^-$ (4) $Li_2FeS_2 \leftrightarrows Li_{2-x}FeS_2 + xLi^+ + xe^-$ (0.5<x<0.8)

(5) $Li_{2-x}FeS_2 \leftrightarrows FeS_y + (2-y)S + (2-x) + (2-x)e^-$

However, equation (5) may be better represented by equation (6) based on the results to be outlined below:

(6) 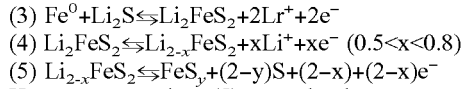
   $Li^+ + (2-x)e^-$

The direct reduction of sulfur by $Li^+$ upon subsequent discharge therefore introduces intermediate polysulfides ($S_n^{2-}$) into the system. In a liquid cell, polysulfides dissolve into the electrolyte and participate in a parasitic "shuttle" mechanism which causes rapid capacity fade and self-discharge. The "shuttle" mechanism is the primary degradation process occurring in sulfur-based cells. Polysulfides cannot dissolve into the solid electrolyte. Therefore, the confinement of polysulfides in an all-solid-state cell inhibits the "shuttle" mechanism.

Charge products at about 30-60° C. are likely a multi-phase mixture of nano-particles of orfhorhombic-$FeS_2$, non-stoichiometric $FeS_y$ phases like pyrrhotite and elemental sulfur. In any case, the electrochemically active products resulting from sequential charge cycles simulate the $FeS_2$ chemistry as well as provide electrical conductivity within the electrode thus reducing the amount of conductive additive required. This conclusion is supported by the results of a DFT simulation shown in FIGS. 4-6.

FIG. 4 shows an example DFT simulation of lithiated $Li_xFeS_2$ indicating material amorphization and Fe agglomeration for x=4, where (a) is a so-called "ball-and-stick" representation of $Li_xFeS_2$ along a charging cycle from x=4 to x=0, and (b) shows the average Fe-Fe distance ($d_{Fe-Fe}$) at each state in comparison with the Fe bulk value.

FIG. 5 shows: a) Coulometrci titration results for a solid-state cell titrated at 60° C. compared with the first second, and tenth discharge profiles for a solid-state cell cycled at 60° C., b) shows dQ/dV of a solid-state cell cycled at 30° C., and c) shows deconvolution of the dQ/dV peaks at 2.1 and 2.2V with fitted peaks and residual.

FIG. 6 shows electrode material from the solid-state cell cycled at 60° C. recovered after the twentieth charge for transmission electron microscope (TEM) analysis, where: (a) is a bright field TEM image of the twentieth cycle sample with darker areas corresponding to nano-crystalline orthorhombic-$FeS_2$ and lighter areas corresponding to an amorphous region composed of $FeS_y$ and elemental sulfur, and (b) is a high resolution (HR-) TEM of the twentieth cycle sample. FFT analysis matches with orthorhombic-$FeS_2$ along the [-110] zone axis.

Contrary to previous assumptions, subsequent discharges largely follow the same initial reaction path, instead, the difference between the initial and subsequent discharge profiles is likely to changes in particle morphology and the formation of the more open orthorhombic-$FeS_2$ (marcasite). Thus, equation (6) more accurately describes the chemistry of subsequent cycles.

Figure 5A:
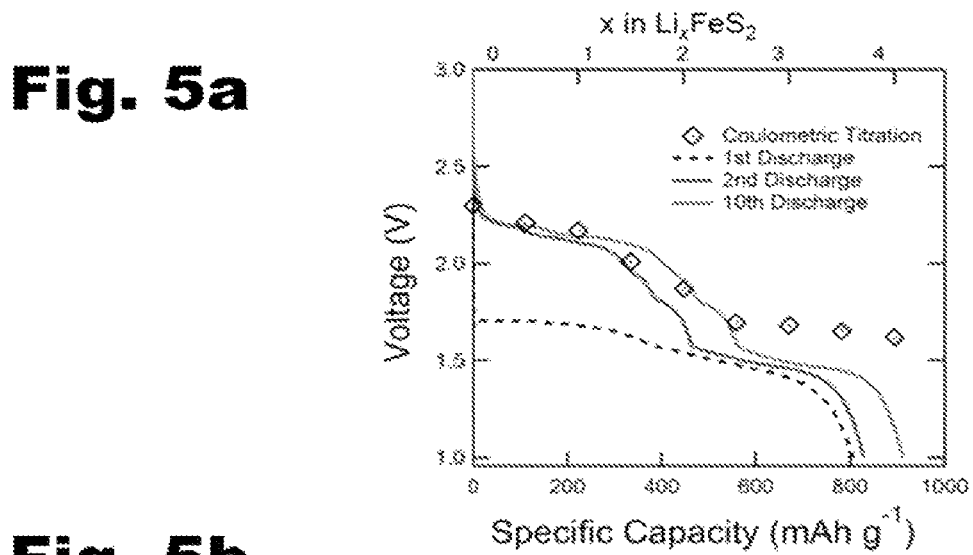
FIG. 5*a* shows Coulometric titration results for a solid-state cell.

A study used coulometric titration to indicate that cubic-$FeS_2$ is not produced electrochemically. However, the time needed for the $FeS_2$ electrode to reach equilibrium is much longer than the 24 hours allowed in that study. When an $FeS_2$ cell is allowed up to about 144 hours to establish equilibrium during initial discharge, the open circuit voltage (OCV) of the cell approaches the voltage of a subsequent discharge at the appropriate reaction coordinate (x) as shown in FIG. 5(a). This result indicates that the difference between the initial discharge profile and subsequent discharge profiles can be explained by kinetics. The difference is not a result of a different reaction pathway. The diffusion of $Li^+$ into the inner core of 2-3 μm pyrite cubes severely limits the reaction rate of $FeS_2$ reduction, if electrochemically produced $FeS_2$ particles are nano-crystalline, then the greatly increased interfacial surface area facilitates a fast reaction rate despite poor $Li^+$ diffusivity. The diffusivity of $Li^+$ may also be improved by regenerating a phase other than cubic-$FeS_2$. For example, orthorhombic-$FeS_2$ has a more open structure than cubic-$FeS_2$. The formation of orthorhombic-$FeS_2$ instead of cubic-$FeS_2$ may result in faster $Li^+$ diffusion, thus further increasing the reduction reaction kinetics.

High resolution transmission electron microscopy (HR-TEM) can be used to support this understanding through direct observation of orthorhombic-$FeS_2$ nano-particles upon charge. In an example, electrode material was recovered from the solid-state cell cycled at about 60° C. upon completion of the twentieth charge as can be seen in FIG. 3(b). This cell exhibits full utilization of $FeS_2$ so it is unlikely that a significant mass of electrochemically inactive synthetic cubic-$FeS_2$ remains in the cell by the twentieth charge.

FIG. 6(a) shows a bright field (BF) TEM image of the 20th cycled charged $FeS_2$ solid-state electrode. This image depicts nano-crystalline domains (darker) of 100-200 nm in diameter encased by an amorphous material (lighter). Fast Fourier transform (FFT) analyses of HR-TEM images matches well with orthorhombic-$FeS_2$ along the [-110] zone axis as can be seen in FIG. 6(b).

Figure 5B:
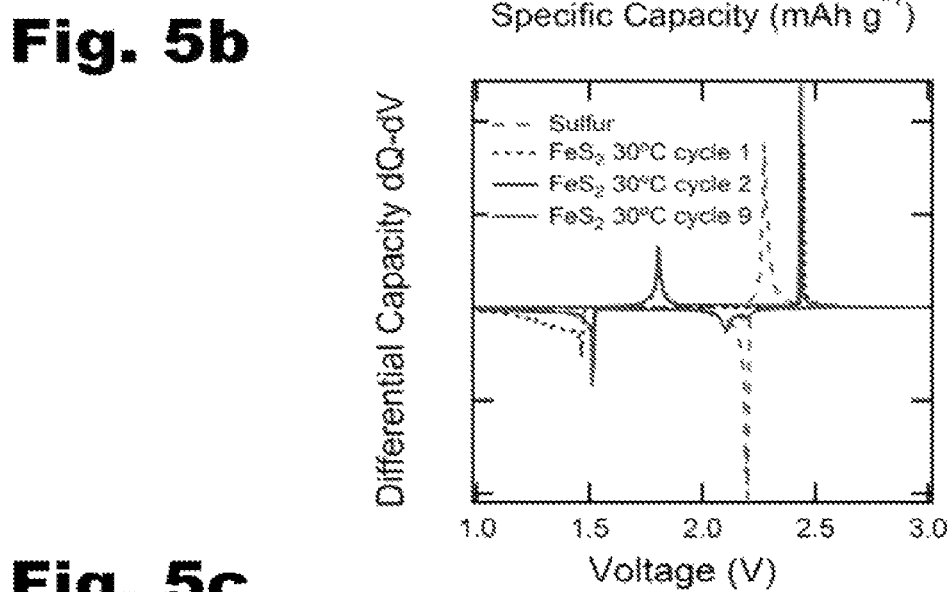
FIG. 5*b* shows dQ/dV of a solid-state cell.

High resolution TEM imaging indicates a large amount of amorphous material encasing the crystalline $FeS_2$ domains. To explore this issue further, the differential capacity of the all-solid-state cell cycled at 30° C. was examined, as can be seen in FIGS. 5(b) and (c). The peaks shown in FIG. 5(b) correspond to the oxidation of $Li_2S$, and the reduction of S in an all-solid-state sulfur cell. The purple peaks correspond to reaction plateaus observed in the solid-state $FeS_2$ cells cycled at 30° C.

When the solid-state $FeS_2$ cell is charged, no peaks are observed corresponding to the oxidation of $Li_2S$. However, upon discharge a peak is observed at 2.2V, which corresponds to the direct reduction of sulfur to $Li_2S$. This result indicates that discharge and charge of a $FeS_2$ all-solid-state cell at higher voltages at least somewhat follows equation (5), above. It indicates that sulfur is electrochemically produced by the disproportionation of $Li_2FeS_2$. For this reason, the amorphous region is likely a mixture of elemental sulfur and non-stoichiometric $FeS_y$.

Figure 5C:
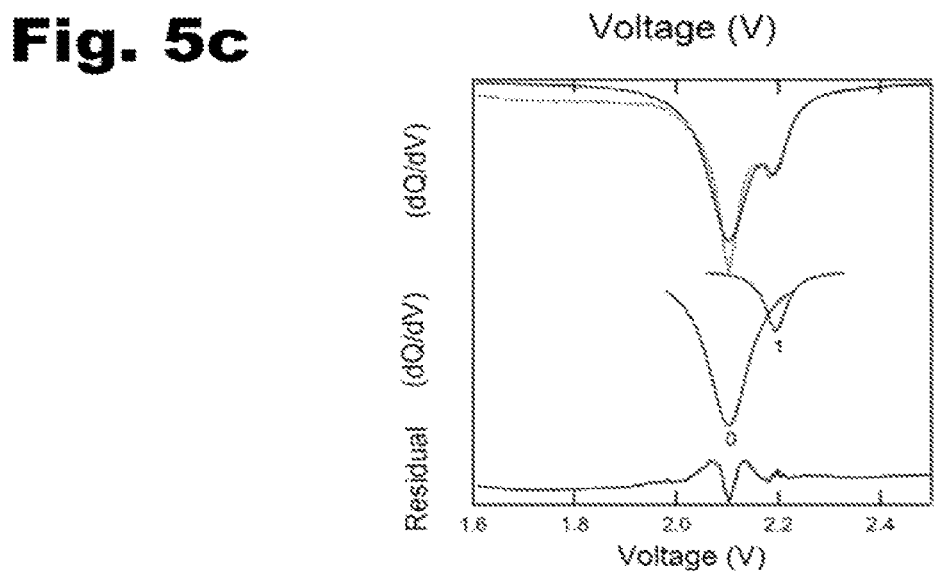
FIG. 5*c* shows deconvolution of the dQ/dV peaks.

To quantify the amount of elemental sulfur produced upon charging, all elemental sulfur is said to be directly reduced to Li$_2$S at 2.2V. The solid-state cell cycled at about 30° C. exhibited a discharge capacity of about 737 mAh g$^{-1}$ upon the ninth discharge. If the peaks at 2.1 and 2.2 V correspond to the reaction of charge products with two electrons, then integrating the dQ/dV curve between about 1.6 and 2.5 V yields a capacity 368 mAh g$^{-1}$ for this cell. When these two peaks are de-convoluted and fitted with a Voigt profile, the calculated total area gives a capacity of about 342.2 mAh g$^{-1}$, as can be seen in FIG. 5(c). This value matches well with the expected capacity of about 368 mAh g$^{-1}$.

The peak at about 2.2 V has an area of about 57.14 mAh g$^{-1}$, while the peak at about 2.1V has an area of about 285.79 mAh g$^{-1}$. If (2-y)S is directly reduced to Li$_2$S, then the remaining capacity may be attributed to FeS$_y$. The value of y can be determined to be about 0.085. If subsequent discharges follow equation (5), then the chemical formula of FeS$_y$ is about FeS$_{1.92}$. If FeS$_y$ primarily takes the form of Fe$_7$S$_8$ (pyrrhotite), then the chemistry of subsequent cycles likely follows equation (6).

The charge products are likely a multiple phase mixture of nano-crystalline orthorhombic-FeS$_2$, sulfur deficient phases of FeS$_y$, and elemental sulfur. Accordingly, the charge products are believed to be nano-crystalline orthorhombic-FeS$_2$ encased in amorphous sulfur deficient FeS$_y$ and sulfur (see FIG. 6(a)).

Coulometric titration indicates that the initial discharge is kinetically limited, and subsequent discharges follow a similar reaction path (see FIG. 5(a)). Nano-crystalline orthorhombic-FeS$_2$ enables faster reaction rates.

Sulfur reduction was observed at about 2.2V upon charge, but not Li$_2$S oxidation upon charge, as can be seen in FIG. 5(b). FeS$_y$ phases and elemental sulfur may explain the amorphous domains observed in the high resolution TEM images. The presence of sulfur deficient FeS$_y$ phases and the observation of orthorhombic-FeS$_2$ is consistent, Orthorhombic-FeS$_2$ exhibits very weak temperature independent paramagnetism. For this reason, it is likely that $^{57}$Fe Mossbauer spectroscopy used in previous studies was not capable of distinguishing orthorhombic-FeS$_2$ from other strong temperature dependent paramagnetic phases like FeS$_y$ and cubic-FeS$_2$. By way of example, Fe$_7$S$_8$ is ferrimagnetic while FeS is paramagnetic. It is noted that ferrimagnetism is a much stronger effect.

Figure 4A:
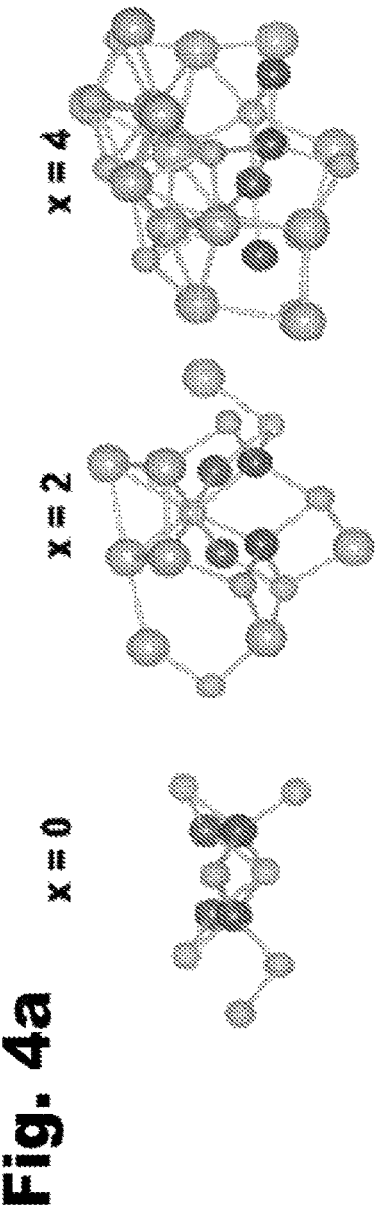
FIG. 4*a* shows an example DFT simulation, which is a so-called "ball-and-stick" representation of $Li_xFeS_2$ along a charging cycle.
Figure 4B:
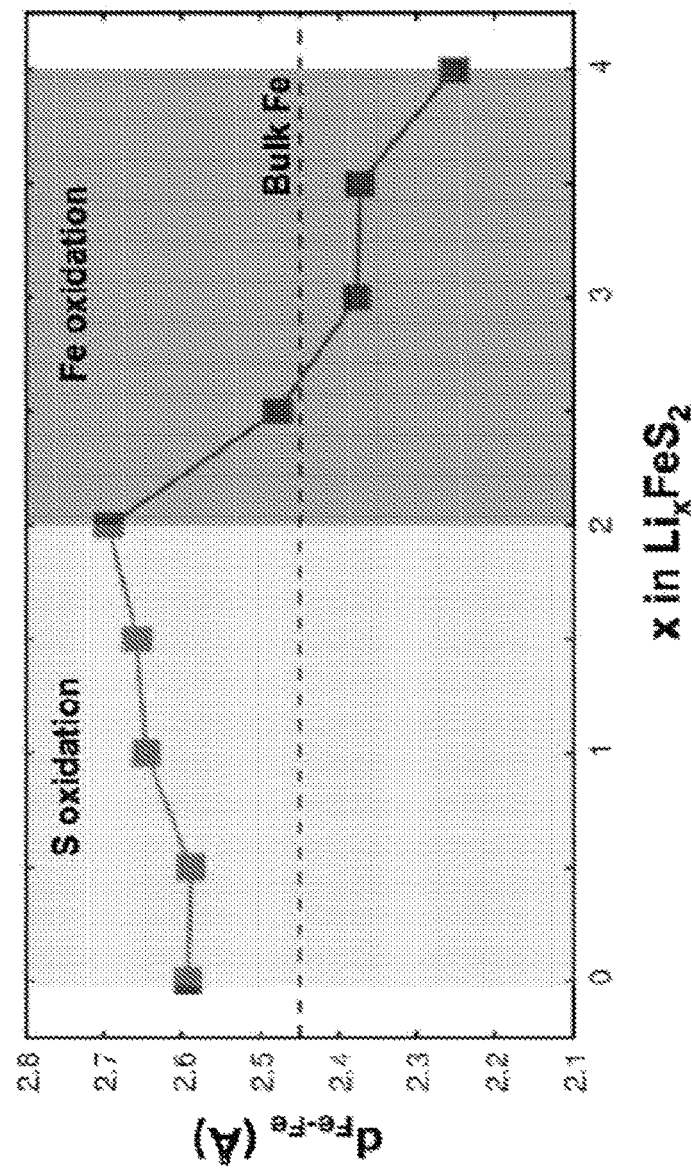
FIG. 4*b* shows an example DFT simulation, which illustrates the average Fe-Fe distance ($d_{Fe-Fe}$) at each state in comparison with the Fe bulk value.

The results of the DFT analysis shown in FIG. 4 indicate the formation of highly reactive atomic particles of Fe$^0$ the fully-discharged, amorphous-like Li$_4$FeS$_2$ model (FIG. 4(a)) shows nanoscale separation of a Fe$^0$ nanocluster from Li$_2$S. The average Fe-Fe interatomic distance (dFe-Fe) at full discharge, x=4, is much shorter than that of Fe in the bulk (FIG. 4(b)). A shorter dFe-Fe indicates that Fe$^0$ should be very catalytically active. Results also indicate the presence of elemental sulfur as a charge product. At x=0, our atomic model depicts some degree of FeS$_2$ crystallization with a rather open structure (FIG. 4a). The x=0 model also depicts the presence of a S$_2$ dimer. It is the presence of elemental sulfur that inhibits the full crystallization of FeS$_2$ in our simulation. It is likely that the observed FeS$_{2-y}$ nano-clusters could crystalize into orthorhombic-FeS$_2$ rather than cubio-FeS$_2$ because of the former's lower density.

Before continuing, it should be noted that the description of example ambient temperature, reversible metallic lithium iron sulfide (FeS$_2$) solid-state batteries given above and further described below with reference to specific Examples is provided for purposes of illustration, and is not intended to be limiting. Other devices and/or device configurations using these and/or other materials may be utilized as will be readily apparent to one having ordinary skill in the art after becoming familiar with the teachings herein.

EXAMPLE 1

In this example, the batteries discussed above were made for laboratory scale analysis using commercially available polyvinylpyrrolidone (PVP, M$_{w,avg}$=10,000) and FeCl$_2$*4H$_2$O (>99%) obtained from Sigma Aldrich, ethylene glycol (99%) obtained from Mallinckrodt Baker Inc., and sulfur obtained from Fischer Scientific. HPLC grade water, analytical grade NaQH, and absolute ethanol were used: without further purification. The FeS$_2$ synthetic methodology used solvothermal reaction conditions. Dielectric heating for the reaction was provided with a microwave reactor. Microwave heating was selected because of its high reproducibility and the ability for automation, making this methodology amenable to high throughput syntheses.

For the reaction 17 mL of ethylene glycol was added to 600 mg of PVP in a 35 ml microwave flask with a magnetic stirbar. Then 127 mg FeCl$_2$*4H$_2$O (0.64 mmol) was introduced. 8 mL of 1 M NaOH was then added, resulting in a dark green color. Finally, 180 mg of sulfur was added. This solution was stirred for 20 minutes while changing color from green to black. Some sulfur remained undissolved during this process. The reaction flask was then capped (70% full) and introduced to the microwave.

The microwave used for this example was a Discover SP (CEM Inc.). The sample was irradiated with 75 W of power until reaching 190° C., as measured by an infrared detector. The heating took about 7 minutes, and was held at this temperature for 12 hours. Approximately 690 kPa of autogenous pressure was generated. After the reaction was finished, the product was cooled by compressed air.

The resulting silver colored precipitate was separated by centrifugation and washed three times by sonication in ethanol. The precipitate was then stored in ethanol and vacuum dried overnight at 50° C. for battery utilization. Synthetic FeS$_2$ was characterized by Cu-Kα x-ray diffraction (XRD) measurement, FESEM microscopy (JEOL JSM-7401F), and Raman spectroscopy (Jasco NRS-3100).

Cell fabrication and cell testing for this example was carried out under an inert argon gas environment. The all-solid-state cells used in this study were based upon the 77.5Li$_2$S-22.5P$_2$S$_5$ binary solid-state electrolyte. The composite positive electrode had a 10:20:2 weight ratio mixture of synthetically prepared FeS$_2$. 77.5Li$_2$S-22.5P$_2$S$_5$, and carbon black (Timcal Super C65), respectively. The composite positive electrode was mixed using an agate mortar and pestle. Stabilized lithium metal powder (SLMP) was used as the negative electrode (FMC Lithium Corp.). The construction of solid-state cells utilized a titanium-potyarylether-therketone (PEEK) test cell die. 200 mg of solid electrolyte powder was pressed at 1 metric ton in the PEEK cell die. 5 mg of composite positive electrode and the stabilized lithium metal powder were then attached to opposite sides of the solid electrolyte layer by pressing at 5 metric tons.

Liquid cells were fabricated by spreading an electrode slurry with a 6:2:2 weight ratio of synthetic FeS2, polyvinyifluorine (PVDF) binder (Alfa Aesar) and acetylene black (Alfa-Aesar, 50% compressed) respectively. PVDF binder was first dissolved into N-methyl-2-Pyrrolidone (NMP) (Alfa-Aesar) solvent. FeS$_2$ and acetylene black were then stirred into the PVDF binder. A 50 µm thick layer of slurry was spread on onto aluminum foil (ESPI Metals, 0.001" thick) and dried at 60° C. in a single wall gravity convection oven (Blue M) for 5 hours. To ensure good electronic contact, the electrode sheet was then calendared with a Durston rolling mill to 75% of the total thickness. %6" diameter electrodes were punched and heat treated at 200° C. in an Argon environment overnight. FeS$_2$ electrodes were then assembled into coin cells with a lithium foil negative electrode (Alfa-Aesar, 0.25mm thick) and 1 M LiPF$_4$ electrolyte.

Cells were cycled galvanostatically using an Arbin BT2100 battery tester at room temperature (30° C.) and elevated temperature (60° C.). Declared C-rates were based upon FeS$_2$'s theoretical capacity of 894 mAh g$^{-1}$. Reaction equilibrium was studied by use of the galvanostatic intermittent titration technique (GITT).

EXAMPLE 2

Figure 7A:
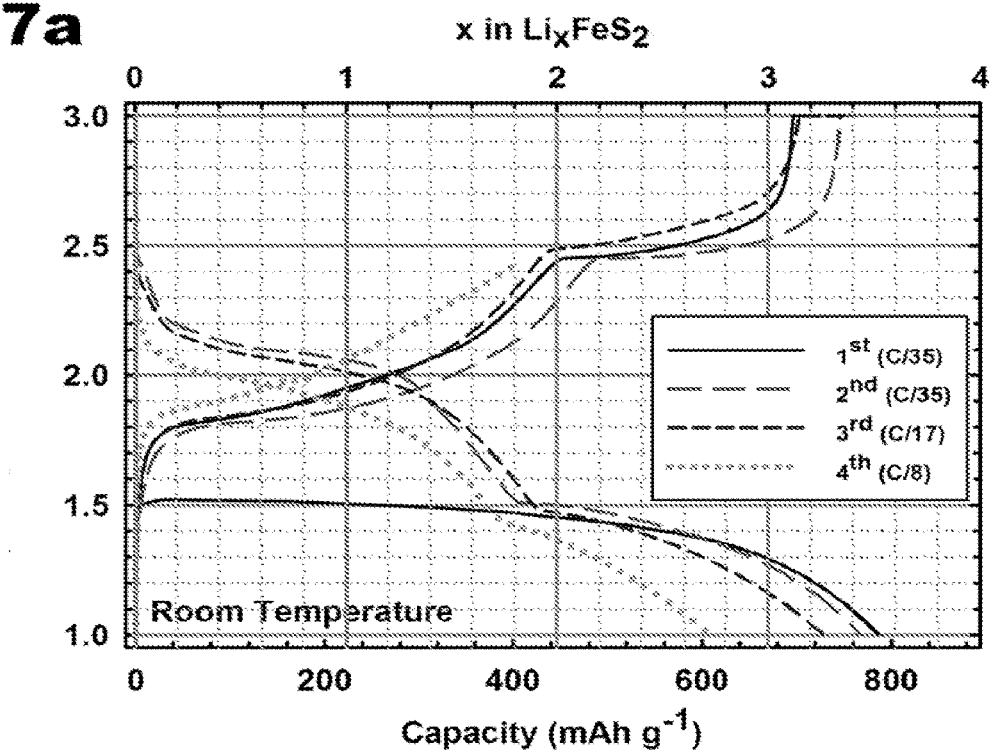
FIG. 7*a* is a plot showing actual data obtained for Example 2.
Figure 7B:
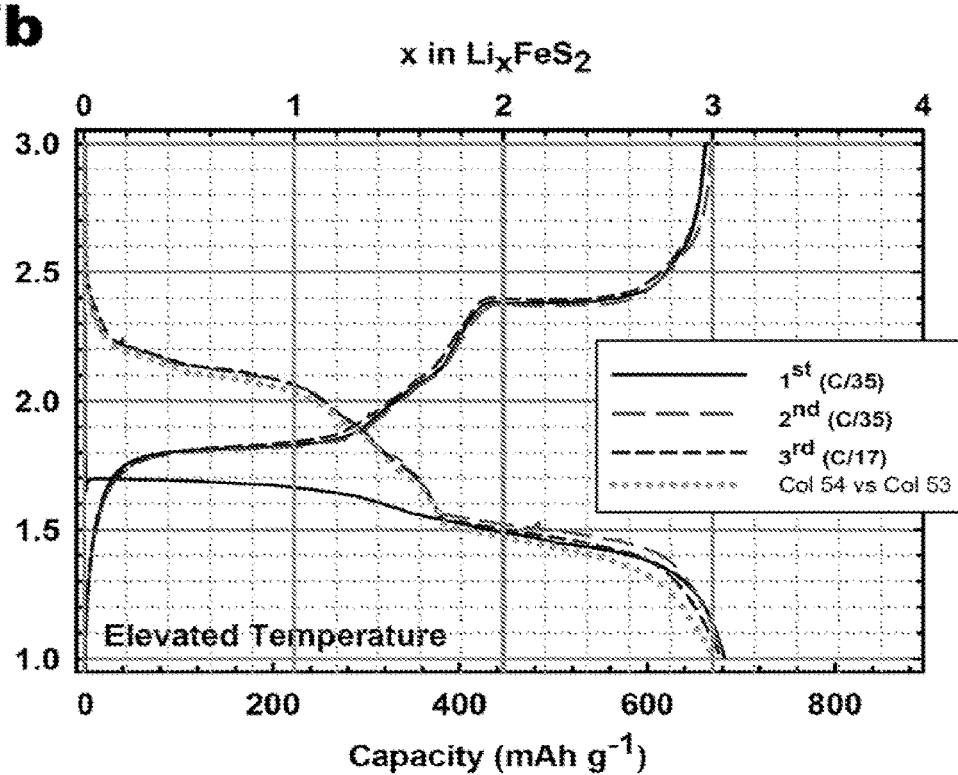
FIG. 7*b* is a plot showing actual data obtained for Example 2.
Figure 8A:
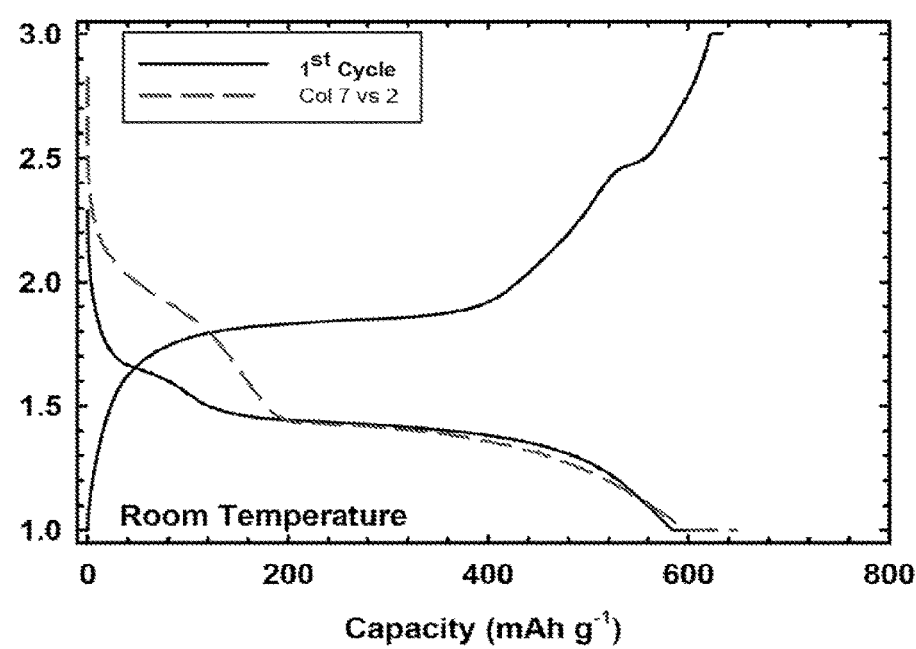
FIG. 8*a* is a plot showing actual data obtained for Example 2.
Figure 8B:
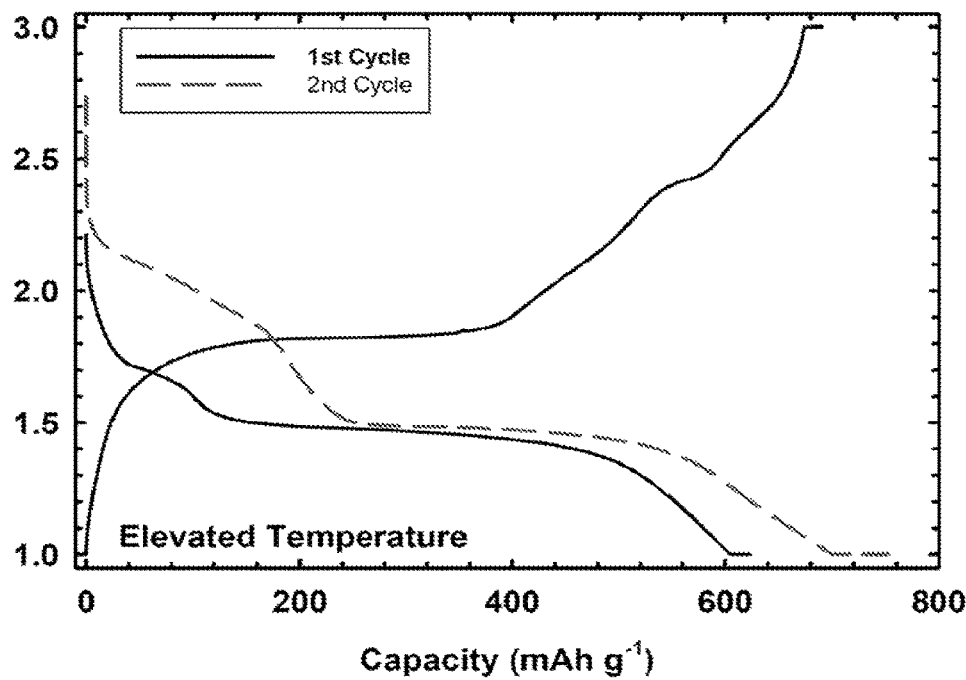
FIG. 8*b* is a plot showing actual data obtained for Example 2.
Figure 9A:
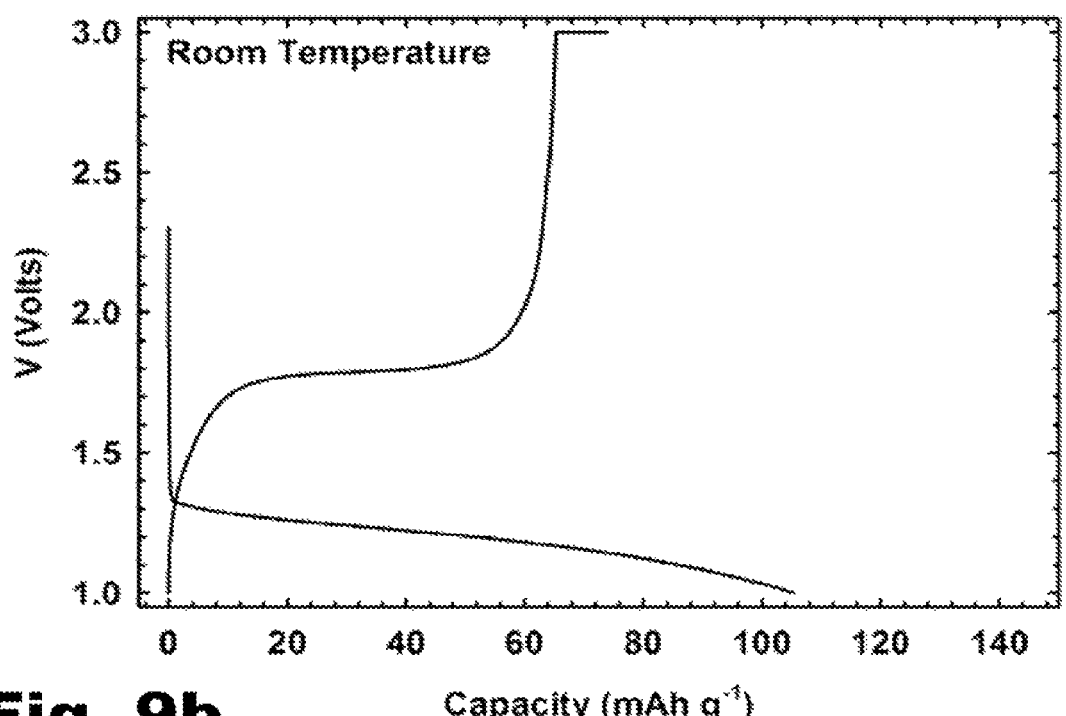
FIG. 9*a* is a plot showing actual data obtained for Example 2.
Figure 9B:
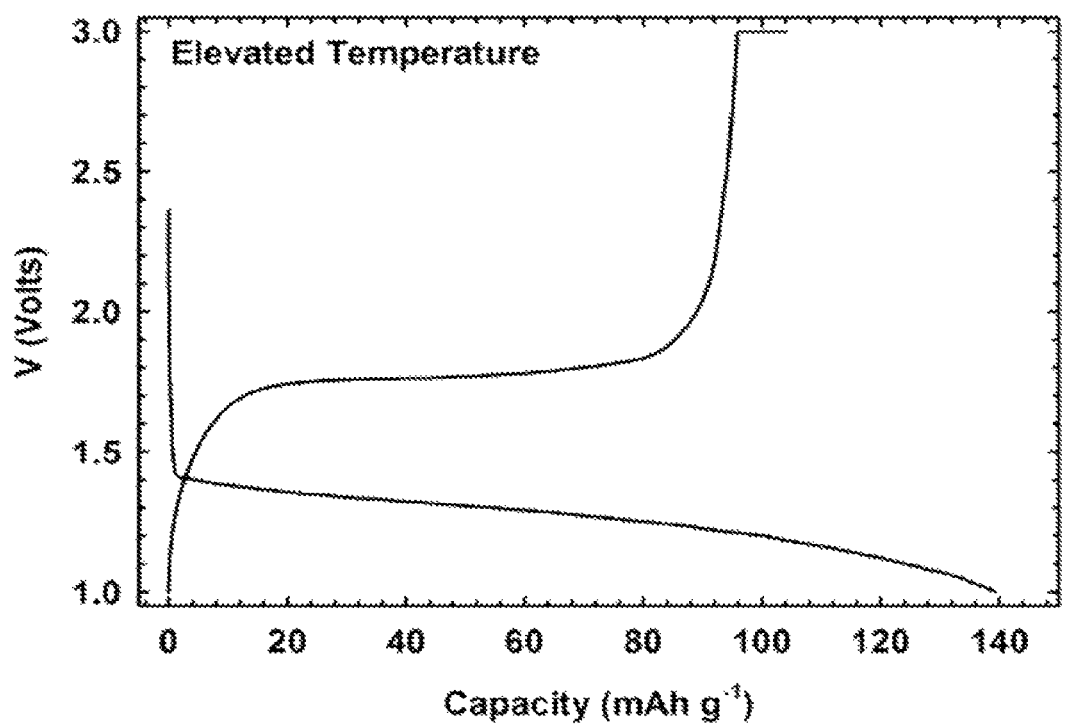
FIG. 9*b* is a plot showing actual data obtained for Example 2.

FIGS. 7-9 are plots showing actual data obtained for Example 2. Specifically, FIG. 7 shows charge/discharge profiles for FeS$_2$ in a solid state lithium battery, made from microwave synthesis. FIG. 8 shows charge/discharge profiles for in-situ formation of FeS$_2$ upon cycling of FeS+S combined by planetary ball milling (cycled at C/10). The top plot in FIG. 9 shows the performance of FeS, with significantly lowered capacity and a lack of voltage plateaus correlating to Eq. 7 and 8 below. Upon discharge at room temperature, a slightly lower voltage is observed due to internal resistance in the cell, and similarly for charging with a slightly higher voltage. A significant decrease in reversibility is also observed, with first cycle coulombic efficiency of both room temperature and elevated temperature FeS cells below 75%. The bottom plot in FIG. 8 shows a first cycle of FeS at (a) room temperature and (b) elevated temperature.

In this example, solid state batteries utilizing highly conducting sulfide based solid electrolytes were used for reversible cycling of FeS$_2$ electrodes in both room temperature (25° C.) and elevated temperature environments (60° C.) as shown in FIG. 7. Furthermore, it was shown that there is no capacity loss for increasing rates up to C/8 for elevated temperature testing. The first cycle shows the reaction formation of Li$_2$S and Fe down to 1.0V. Reversible cycling is allowed by the highly reactive iron allowing successful de-Lithiation of Li$_2$S, and subsequent formation of various Li-Fe-S compounds according to the following equations which are visible in the charging profile.

(7) $3Li+2FeS_2 \rightarrow Li_3Fe_2S_4$ (2.1V)
(8) $Li_3Fe_2S_4 \rightarrow 2Li_2FeS_2$ (1.9V)
(9) $Li_2FeS_2+2Li \rightarrow Fe+2Li_2S$ (1.6V)

After the first cycle, well defined voltage plateaus exist, showing the successful formation of FeS$_2$ (from discharging) upon charging, and subsequent formation of specific reversible Li-Fe-S phases upon discharge.

FeS$_2$ was formed in-situ during the first cycle (and also occurs over the course of many cycles), utilizing stoichiometric combinations of other materials. FeS and S were mixed either by mortar and pestle grinding, or by ball milting to produce an active material that is simply the addition of both, without formation of FeS$_2$.

Upon the first discharge, plateaus corresponding to FeS and S were present, and resulted in a similar capacity of FeS$_2$ made by microwave synthesis. By comparison (FIG. 8), it can be seen that there is a difference between discharge profiles for FeS$_2$ and FeS+S electrodes. However, these both resulted in the same highly reactive iron species that allows the reversible cycling of Li$_2$S. Voltage plateaus corresponding to the similar peaks of FeS$_2$ occurred for FeS+S electrodes (FIG. 8) during charging. Subsequent discharging (2nd cycle) shows that these exhibited high reversibility and reaction plateaus for FeS$_2$, resulting from the FeS/S electrodes. Based on this understanding, it is further noted that another potential system includes electrochemical formation of FeS$_2$ from elemental iron and sulfur being ball milted or mixed by hand.

Thermoelectrochemical Activation of Solid State Electrolyte

Thermoelectrochemical activation of solid state electrolyte is also disclosed herein. To increase cell energy density, it may be desirable to thermally activate the solid state electrolyte (e.g., Li$_2$S) in sulfide-based solid electrolytes, including but not limited to xLi$_2$S-(100-x)P$_2$S$_5$. Initially charging a cell at an elevated temperature increases the energy density of the cell in one example by over 50%.

For purposes of illustration, two different composite electrodes were studied: an 80Li$_2$S-20P$_2$S$_5$:acetylene black composite with a 20:1 weight ratio respectively and a TiS$_2$:80Li$_2$S-20P$_2$S$_5$:acetylene black composite with 10.20:1 weight ratio respectively. The cells in this example have an In metal negative electrode. However, the claims are not limited to these electrodes, as suitable substitutes may be used as will be understood by those having ordinary skill in the art after becoming familiar with the teachings herein.

Figure 10:
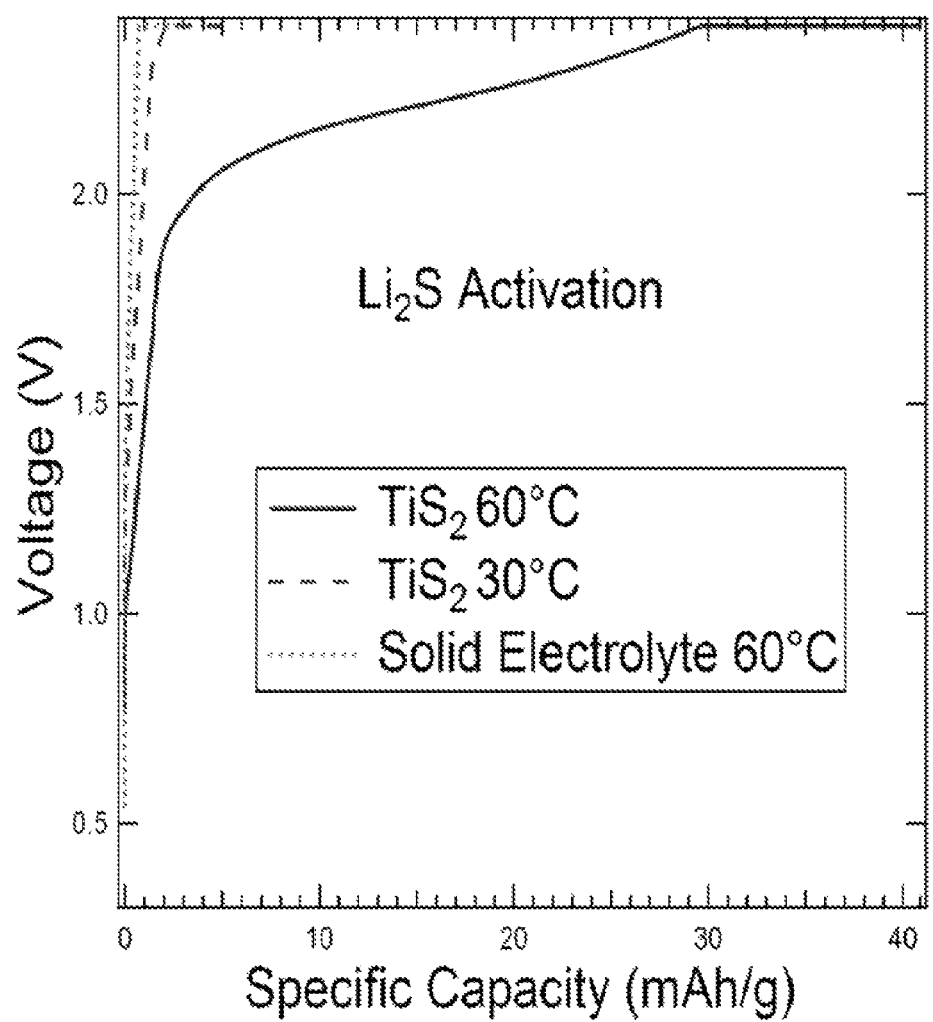
FIG. 10 is a plot illustrating that activation of $Li_2S$ exhibits ionic and electronic conductivity, as well as added thermal energy.

FIG. 10 is a plot illustrating that the activation of Li$_2$S is based at least in part on both the sonic and electronic conductivity of TiS$_2$, as well as added thermal energy (e.g., about 60° C.). The specific charge capacities shown in FIG. 10 are based on the total mass of TiS$_2$ solid electrolyte and acetylene black. Even at elevated temperature the composite with only solid electrolyte shows no capacity. Likewise, the composite with TiS$_2$ also shows no capacity when charged at room temperature.

However, the composite electrode with TiS$_2$ exhibited a charge capacity of 13 mAh g$^{-1}$ when charged at an elevated temperature of about 60° C. This corresponds to a specific charge capacity of about 40 mAh g$^{-1}$ based upon the TiS$_2$ mass. As these cells have a lithium-ion configuration, and TiS$_2$ is already in the charged state, the only source of lithium in these cells was Li$_2$S. Under an applied current at elevated temperature, it is believed that otherwise inert Li$_2$S is activated by the highly ionic and electronic conductive character of TiS$_2$. Other transition metal sulfides have similar material properties as TiS$_2$, and may be useful in a similar Li$_2$S activation process.

Figure 11:
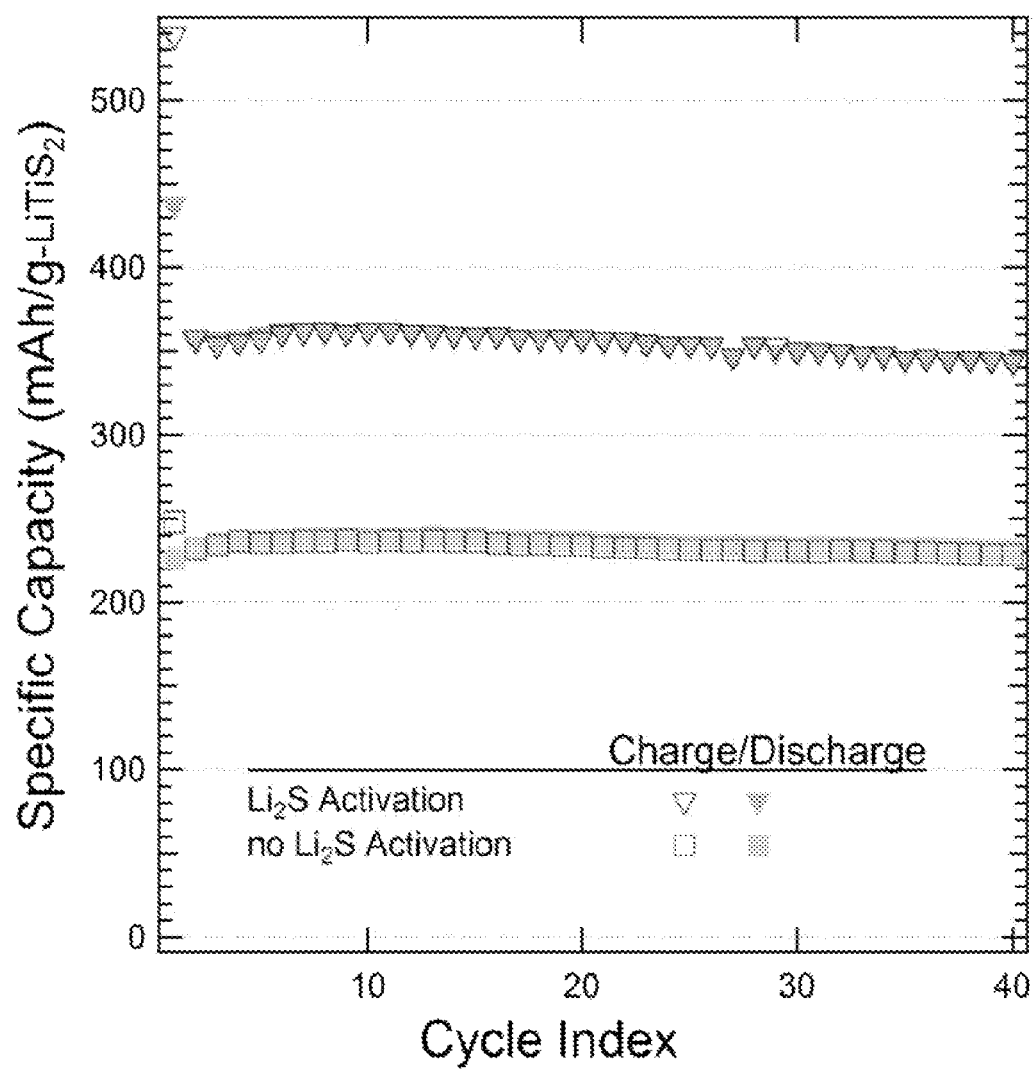
FIG. 11 is a plot showing cells cycled at C/5 and C/5 charge and discharge rates.
Figure 12A:
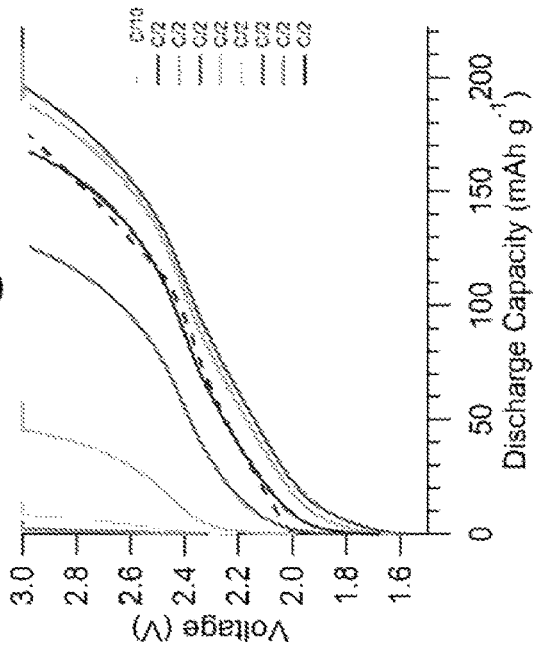
FIG. 12*a* is a plot of an example rate study.
Figure 12B:
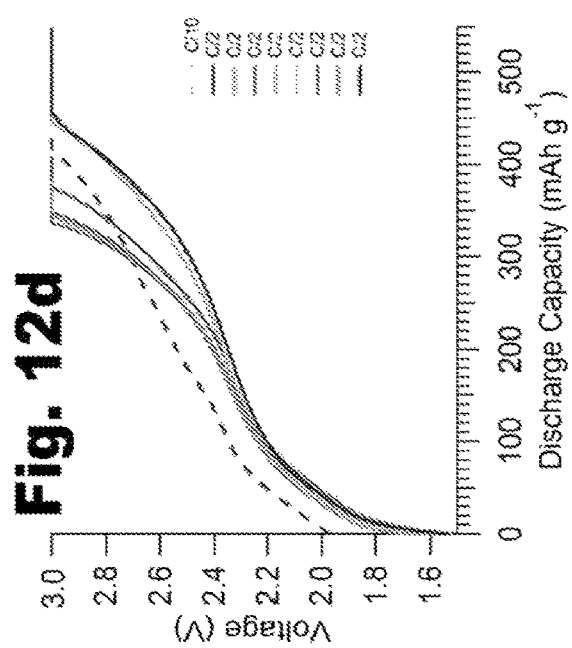
FIG. 12*b* is a plot of an example rate study.
Figure 12C:
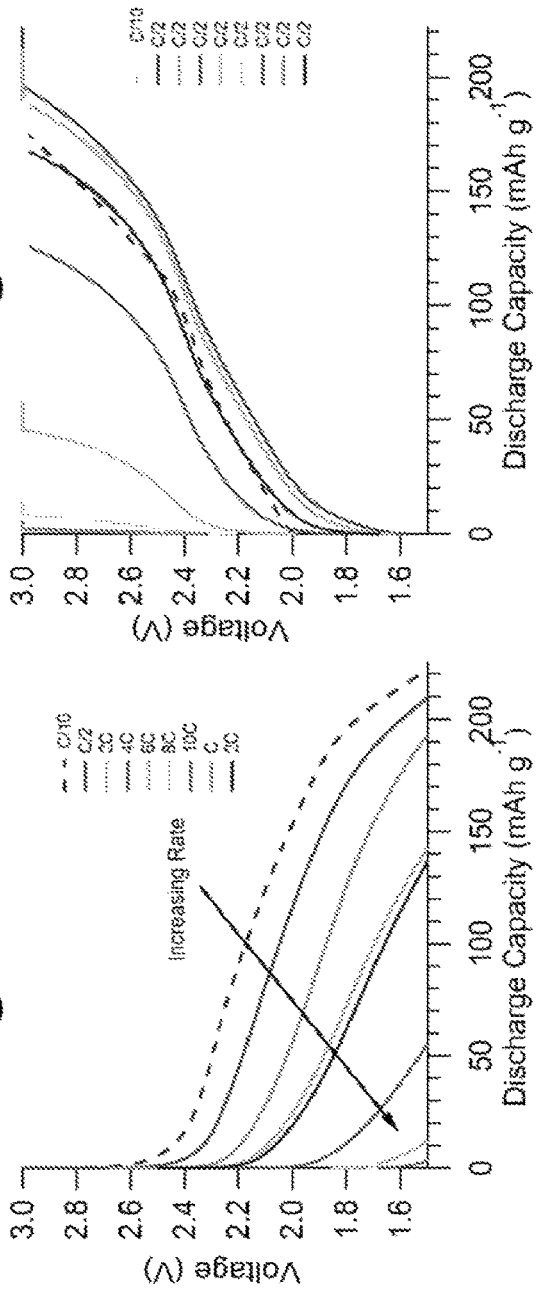
FIG. 12*c* is a plot of an example rate study.
Figure 12D:
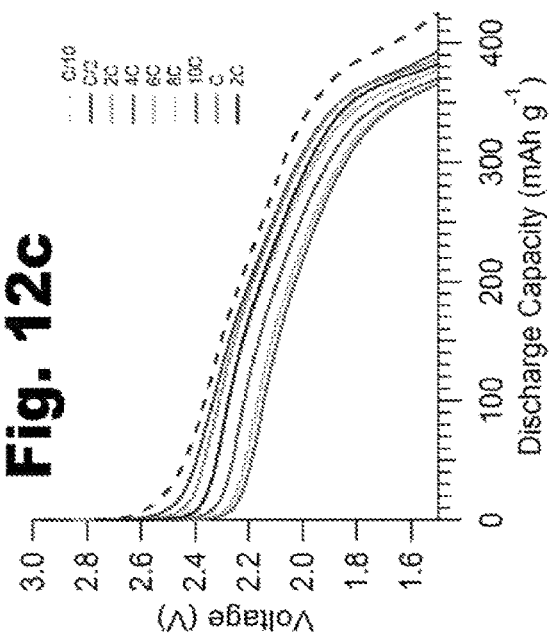
FIG. 12*d* is a plot of an example rate study.

FIG. 11 shows results of thermo-electrochemical activation of Li$_2$S using nano-LiTiS$_2$. FIG. 11 is a plot showing cells with a 10:20:1 wt % nano-LiTiS$_2$: 80Li$_2$S-20P$_2$S$_5$: acetylene black composite electrode cycled at C/5 and C/5 charge and discharge rates. The bottom data series (squares) shows the cell cycled at 30° C. (without thermal-electrochemical activation), and the top data series (triangles) shows the cell initially charged at 60° C. before being removed to room temperature. The nano-LiTiS$_2$ was synthesized using mechano-chemical milling process involving Li$_3$N decomposition. The composite electrodes are a 10:20:1 weight ratio mixture of nano-LiTiS$_2$:80Li$_2$S-20P$_2$S$_5$:acetylene black.

The cells in this example have an In metal negative electrode and are cycled at a rate of C/5 for both charge and discharge. However, the initial charge and discharge cycles are both conducted at a rate of C/10. Specific charge capacities presented are based upon the mass of LiTiS$_2$ initially present in the composite electrode.

The first cell cycled at room temperature exhibits a very stable capacity of about 230 mAh g$^{-1}$ after about forty cycles. The second cell undergoes an initial elevated temperature activation charge at about 60° C. It is then moved to room temperature (about 30° C.) for the first discharge and all cycles thereafter. This cell exhibits a 345 mAh g$^{-1}$ discharge capacity after about the fortieth cycle. This represents about a 119 mAh g$^{-1}$ (or about a 53%) increase in capacity over the theoretical capacity of LiTiS$_2$ of 226mAh g$^{-1}$.

The increase in capacity observed with nano-LiTiS$_2$ is much larger than the 40 mAh g$^{-1}$ excess capacity achieved with the TiS$_2$-80Li$_2$S:P$_2$S$_5$-acetylene black composite. The greater surface area of the nano-LiTiS$_2$ particles is thought to more easily facilitate the activation of Li$_2$S in the solid electrolyte. Supporting the previous finding, the rate performance of nano-LiTiS$_2$ composite electrodes is shown in FIG. 12.

FIGS. 12(a)-(d) are plots of an illustrative rate study of a 10:20:1 wt % LiTiS$_2$: 80Li$_2$S-20P$_2$S$_5$:acetylene black composite electrode, where (a) and (b) are at 30° C., and (c) and (d) are at 60° C. The plots in FIGS. 12(a)-(d) confirm the repeatability of results shown in FIG. 11. The cell cycled at an elevated temperature exhibits discharge capacities in excess of 160 mAhg$^{-1}$ greater than the theoretical capacity of 226 mAhg$^{-1}$ for LiTiS$_2$.

The cells in this example have a Li metal negative electrode to facilitate fast ion transfer. It is noted that the cell cycled at elevated temperature has a specific discharge capacity of nearly 390 mAh g$^{-1}$ at a rate of C/2 while the cell cycled room temperature only exhibits a capacity of 210 mAh g$^{-1}$ at C/2. Repeatedly charging at elevated temperature activates Li$_2$S in the solid electrolyte, providing excess capacity.

Figure 13A:
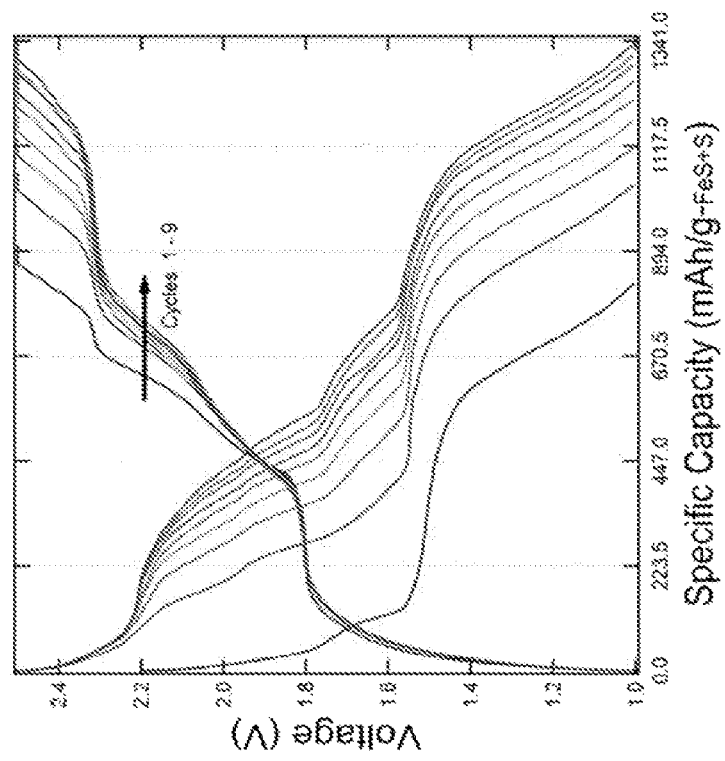
FIG. 13*a* is a plot showing cycling data for a lithium metal cell.
Figure 13B:
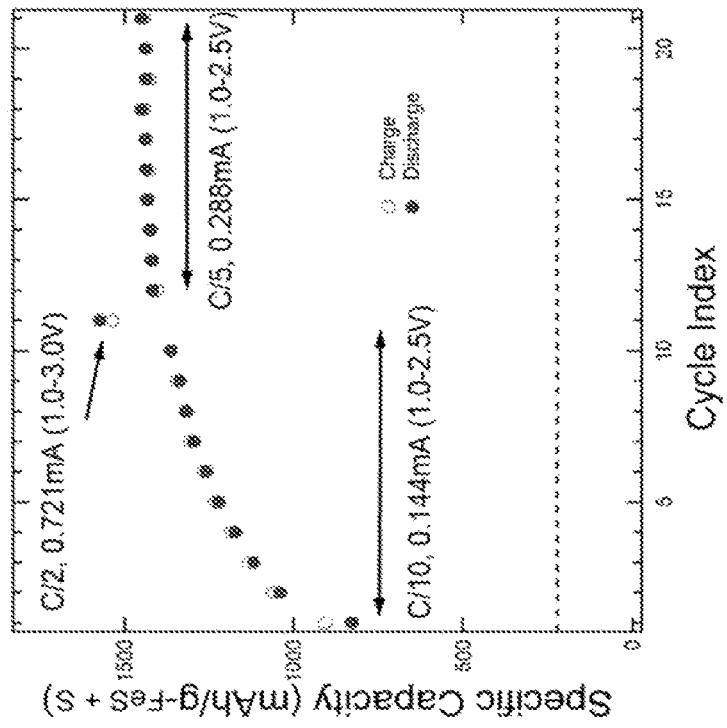
FIG. 13*b* is a plot showing cycling data for a lithium metal cell.

FIGS. 13(a)-(b) are plots showing cycling data for a lithium metal cell. The plots show cycling data for a lithium metal cell with a 10:20:1 wt % FeS8/7+S:77.5Li$_2$S-22.5P$_2$S$_5$:acetylene black composite cathode cycled at 60° C. At an elevated temperature, the cell gains capacity during the first 10 cycles. The increase in capacity is attributed to the S/Li$_2$S redox reaction. The activation of excess sulfur is responsible for the evolution of a voltage plateau at about 2.2V. It can foe seen that the cell has a specific discharge capacity of about 807 mAh g$^{-1}$ on the first discharge, but a specific discharge capacity of 1341 mAh g$^{-1}$ by the ninth cycle. This represents an activation of about 534 mAh g$^{-1}$. The activated capacity can be attributed to the evolution of the S/Li$_2$S reduction plateau at about 2.2V.

As stated above, the particular solid electrolyte system in this example is xLi$_2$S-(100−x)P$_2$S$_5$. However, this technique is applicable to any Li$_2$S containing sulfide based electrolyte system is not limited to Li$_2$S-GeS$_2$P$_2$S$_5$ or Li$_2$S-SiS$_2$. These solid electrolytes are known as glass ceramics. During electrolyte synthesis (e.g., by melt-quenching or mechano-chemical milling) Li$_2$S is incorporated into glass formers not limited to GeS$_2$, P$_2$S$_5$, and SiS$_2$. Super-ionically conducting crystalline phases can also be precipitated in a glassy matrix upon subsequent heat treatment. It is also possible, that these crystalline phases may decompose and result in some excess capacity.

Figure 14:
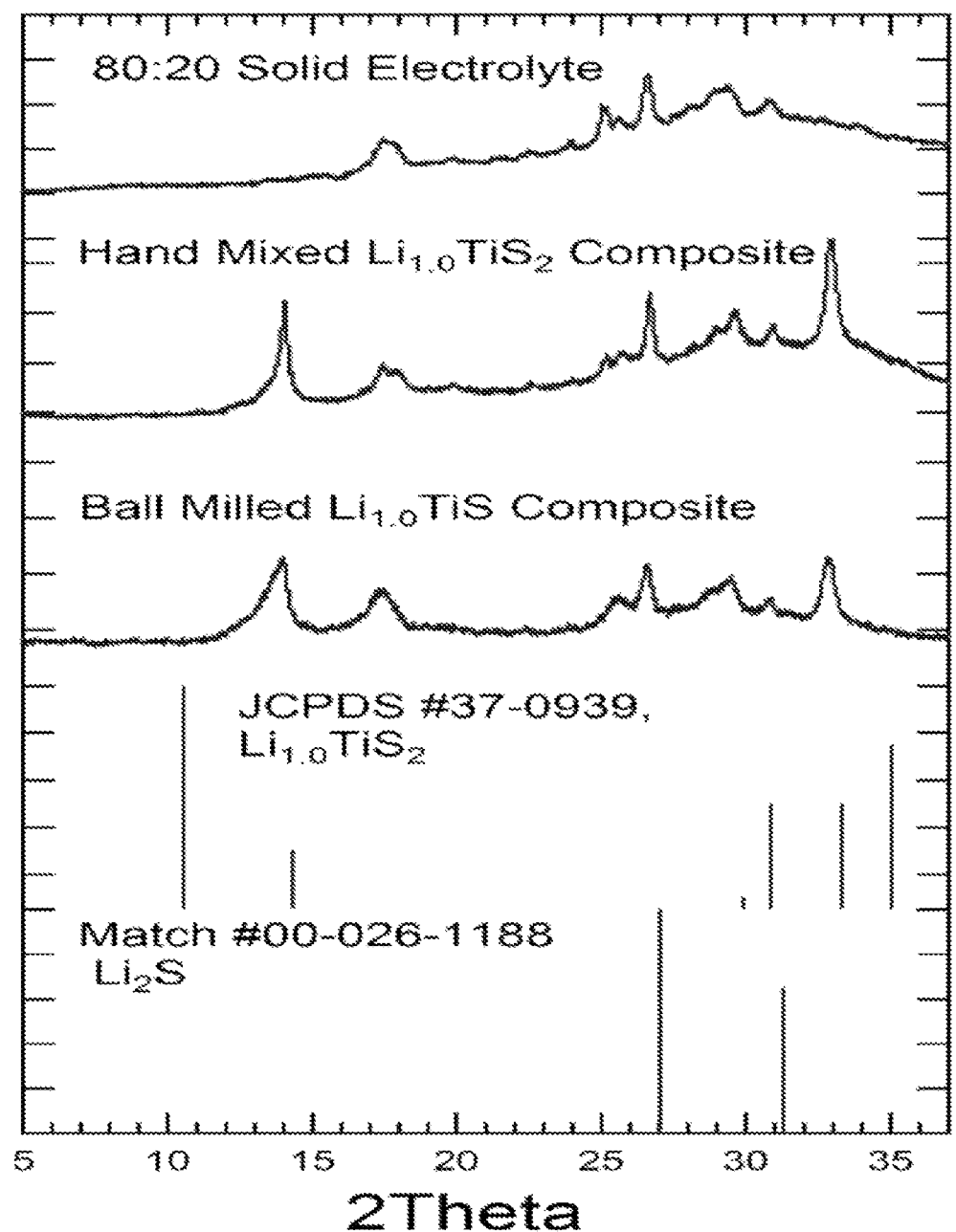
FIG. 14 is an x-ray diffraction (XRD) spectra.

FIG. 14 are x-ray diffraction (XRD) spectra of an example 80Li$_2$S-20P$_2$S$_5$ solid electrolyte, example 10:20:1 wt % LiTiS$_2$:80Li$_2$S-20P$_2$S$_5$; acetylene black composite electrodes, and indexed spectra for Li$_{1.0}$TiS$_2$ and Li$_2$S. The XRD spectra of the solid electrolyte in this illustration shows Li$_2$S peaking at about 27 and about 31.2 degrees, indicating that there are some Li$_2$S domains still present in the solid electrolyte. It is believed that the additional capacity is a result of reacting excess Li$_2$S in the solid electrolyte. It is expected that the 77.5Li$_2$S-22.5P$_2$S$_5$ solid electrolyte has less excess Li$_2$S to participate in activation reactions.

There is evidence of Cu$_y$S formation and Li$_2$S decomposition upon charging at about 25° C. The cells in this example tend to exhibit initial specific charge capacities of up to about 150 mAh g$^{-1}$. Composites without Cu tend to exhibit no capacity, indicating that Cu is a reacting species in the solid electrolyte.

The process described herein is analogous, but is also somewhat different. That is, Cu reacts to form Cu$_y$S, while TiS$_2$ remains chemically/structurally stable. TiS$_2$ is an intercalation electrode material, while CuyS is a conversion battery material. TiS$_2$ succeeds in electrochemically activating excess Li$_2$S because it is both highly ionically and electronically conductive. The process described herein is based on an initial charging at elevated temperature, as no excess capacity is observed at room temperature.

The iron sulfide (FeS$_2$, FeS$_x$, or FeS$_x$+S) systems disclosed herein are more like the Cu$_y$S electrodes. During lithiation (reduction), FeS$_2$ is not chemically/structurally stable like TiS$_2$. Instead, FeS$_2$ reacts with 4Li$^+$ in a conversion reaction to form the completely reduced products of Fe$^0$ and 2Li$_2$S. Fe$^0$ acts as a catalyst for the oxidation of Li$_2$S. The products of oxidation include various electronically conducting phases of FeS$_x$. These phases then help to electrochemically activate excess Li$_2$S present in the solid electrolyte.

Electrochemical Evolution of a Bulk-Type All-Solid-State Iron Sulfur Cathode

The lithium all-solid-state battery described above, which may be thermally activated as described above, may also be made using a high capacity conversion battery materials (e.g., FeS$_2$) equivalent. Examples are described in the following discussing as in-situ electrochemical formation of a FeS$_2$ phase and reversible utilization of a glass electrolyte for higher overall electrode energy density. However, the lithium all-solid state battery is not limited to such an implementation.

The results described below show that electrochemically structured interfaces between conversion active materials and the glass electrolyte can be utilized to increase energy density of ASSLBs, while maintaining good rate performance.

For purposes of illustration, synthesis of the iron sulfide based all-solid-state composite electrodes can be by a three step planetary ball milling procedure (Across International, PQ-N2), An example 77,5Li$_2$S-22.5P$_2$S$_5$ (molar ratio) glass electrolyte can be prepared by milling about 0.832 g Li$_2$S (Aldrich, 99.999%, reagent grade) and about 1.168 g P$_2$S$_5$ (Aldrich, 99%) in a 500 mL stainless steel vial (Across international) with two stainless steel balls (having about a 16 mm diameter) and twenty stainless steel balls (having about a 10 mm diameter) at about 400 rpm for about 20 hours.

The 1:1 molar ratio FeS:S active material composite (denoted as FeS+S) can be prepared by milling about 0.733 g FeS (Aldrich, technical grade) and about 0.267 g Sulfur (Aldrich, 99.98%) in a 100mL agate jar (Across International) with five agate balls (having about a 10 mm diameter) and fifty agate balls (having about a 6 mm diameter) at about 400 rpm for about 20 hours.

The composite electrode can be synthesized by milling a ratio of prepared FeS+S, 77.5Li$_2$S-22.5P$_2$S$_5$, and carbon black conductive additive (Timcal, C65) in a 100 mL agate jar with five agate balls (having about a 10 mm diameter) and fifty agate balls (having about a 6 mm diameter) at about 400 rpm for about 18 minutes.

In an example, cell fabrication and cell testing was carried out under an inert Argon gas environment, although other environments may also be utilized. The working electrode is about 5 mg of the mechanically prepared FeS+S based composite electrode, in this example, about 5mg of stabilized lithium metal powder (SLMP) was used as the counter electrode (FMC Lithium Corp., Lectro Max Powder 100). The shell of the solid state battery was a titanium-polyaryletheretherketone (PEEK) test cell die. To fabricate each cell, the glass electrolyte powder was first compressed at about 5 metric tons inside the PEEK cell die to form the separator pellet. In this example, about 5 mg of composite positive electrode and the SLMP were then attached to opposite sides of the glass electrolyte pellet with about 5 metric tons force.

A variety of different batteries were fabricated to aid in the characterization of the FeS+S/Li battery's electrochemistry. Still other examples are contemplated, and the examples discussed herein are merely illustrative. In an example, the FeS in these batteries was prepared by mechanically milling about 2 g of FeS in a 100 ml agate jar (Across International) with five agate balls (having about a 10 mm diameter) and fifty agate balls (having about a 6 mm diameter) at about 400 rpm for about 20 hours. The cells used to electrochemically prepare the cycled XRD samples had a 165 mg FeS composite cathode and an InLi alloy anode. These cells operate at a lower potential because the InLi alloy has a potential of about 0.62V vs. $Li^{3o}$/Li.

In these examples, all cells were cycled under constant current constant voltage (CCCV) conditions using an Arbin BT2000 battery tester at about 60° C. Because the overall capacity of the FeS electrode is a moving target, rate performance is described by current and not by C-rate. Unless otherwise noted, specific capacities are given with respect to the total mass of the composite electrode. Materials are characterized by field emission scanning electron microscopy (FESEM, JEOL JSM-7401F) and Cu-Kα X-ray (XRD) measurement.

FIG. 15 shows (a) XRD of FeS+S composite active material and FeS precursor with indexed reflections for $Fe_7S_8$ and FeS. The FeS precursor material is likely a multiphase mixture of FeS and an iron deficient $Fe_{1-x}S$ phase. After mechanochemical milling, only reflections for FeS and S are observed which indicates that no solid state reactions occurred to form $FeS_2$; and (b) is an FESEM micrograph of the FeS+S composite active material.

Figure 15A:
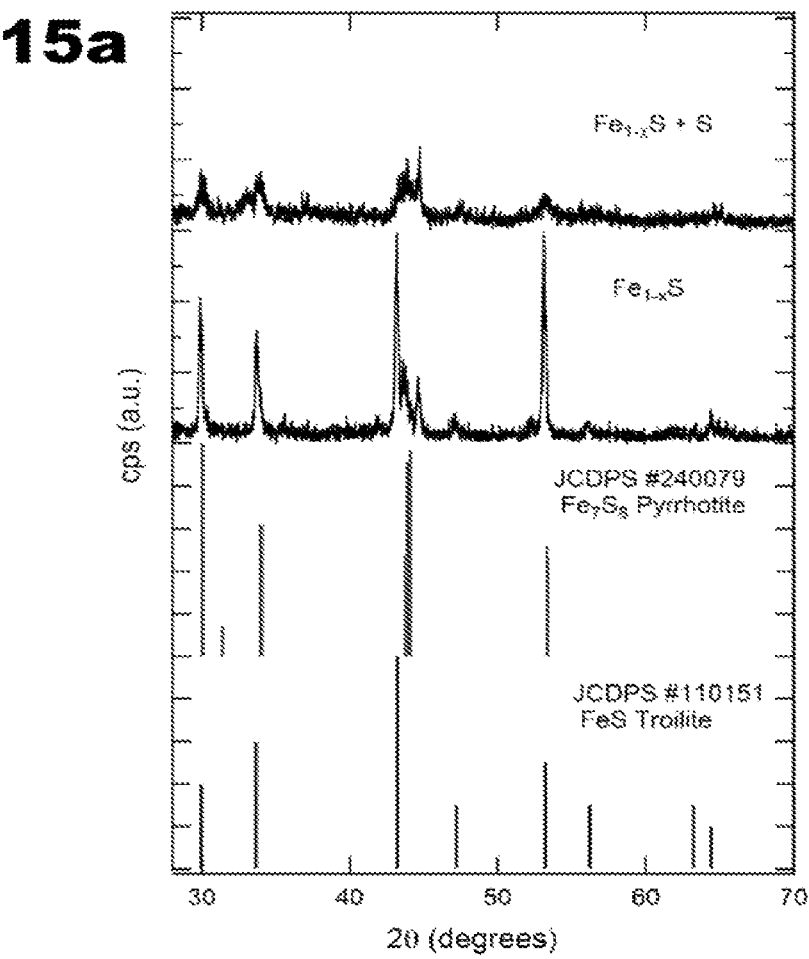
FIG. 15*a* shows x-ray diffraction (XRD) spectra.

XRD measurement presented in FIG. 15(a) shows that the FeS precursor is composed partly of FeS (Triolite). However, the precursor also exhibits ferrimagnetism, which indicates that the sample is likely a multiphase mixture of FeS and an iron deficient phase like $Fe_7S_8$ (Pyrrhotite). An unidentified peak at 44.64° suggests that other phases may be present as well.

Figure 15B:
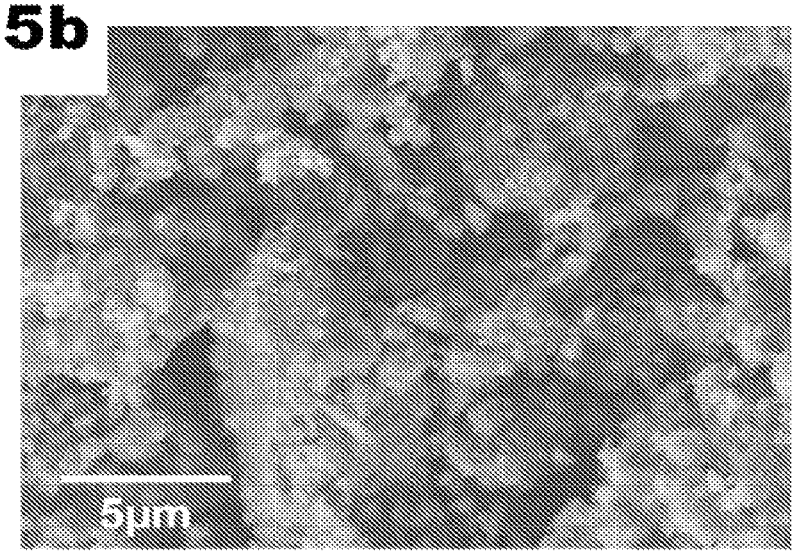
FIG. 15*b* shows a TEM image.

After mechanical milling with S, the reflections for FeS are observed to decrease in intensity and broaden. This is consistent with a decrease in average particle size by mechanical grinding action. Further, no new reflections are observed which suggests that the nano-composite is an intimate mixture of elemental FeS and S. The peak at 37.1° can be attributed to the strong (317) reflection of the S precursor (JCPDS #832285). FIG. 15(b) confirms that the FeS+S nano-composite is comprised of sub-micron sized particles.

The electrochemical behavior of a FeS+S composite electrode over time is complex. FIG. 16 shows (a) cyclic stability of a FeS+S/Li battery. Assuming that the active material composition of FeS+S has a theoretical specific capacity of 900 mAh $g^{-1}$, the electrode's specific capacity should not exceed 281 mAh $g^{-1}$. Excess capacity is evidence for the electrochemical utilization of the $77.5Li_2S-22.5P_2S_5$ glass electrolyte component; and (b)-(e) are voltage profiles for cycles 1, 2, 10, 20, 30, 40, 60, and 150 of the same battery. The variability of voltage profiles with respect to cycle number suggests an evolving electrochemistry.

Figure 16A:
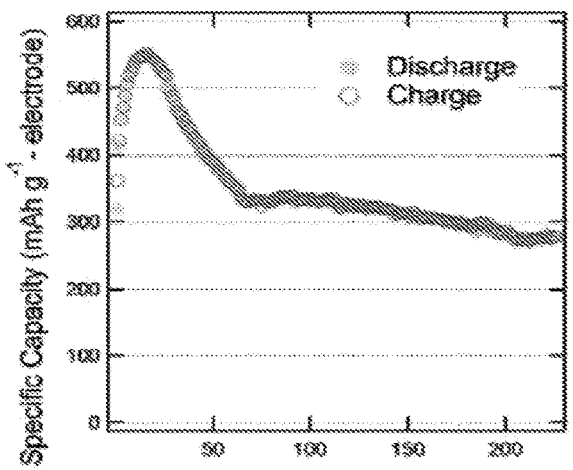
FIG. 16*a* shows cyclic stability of a FeS+S/Li battery.
Figure 16B:
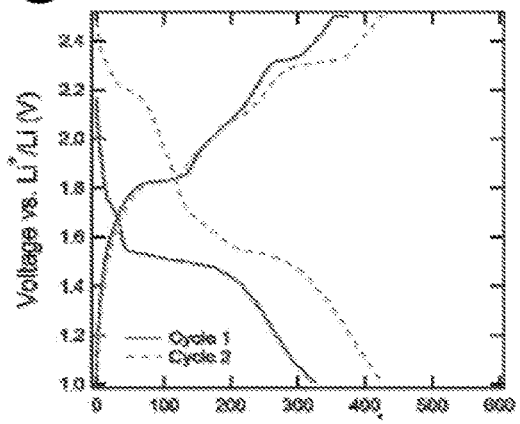
FIG. 16*b* shows a voltage profile of the FIG. 16*a* battery.
Figure 16C:
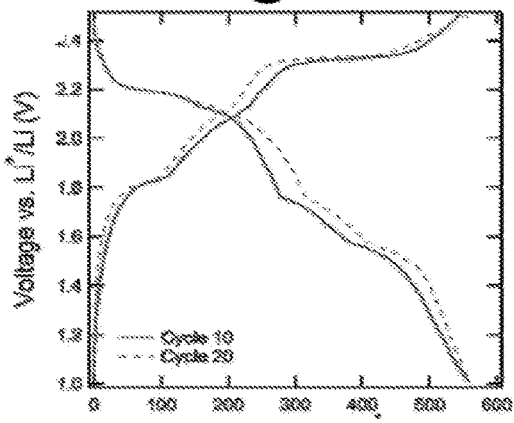
FIG. 16*c* shows a voltage profile of the FIG. 16*a* battery.
Figure 16D:
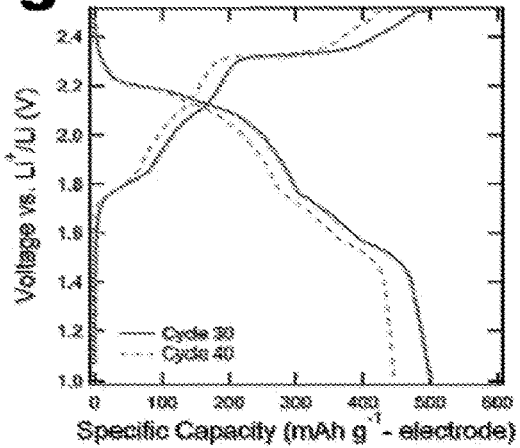
FIG. 16*d* shows a voltage profile of the FIG. 16*a* battery.
Figure 16E:
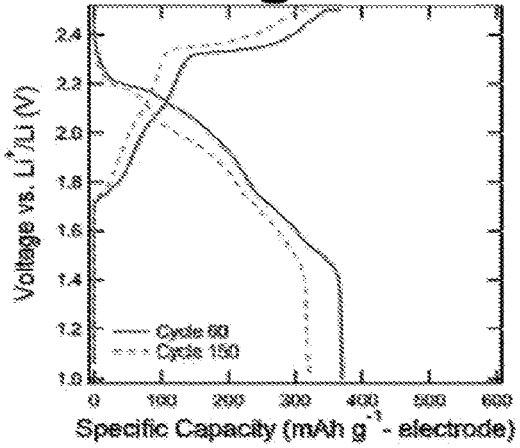
FIG. 16*e* shows a voltage profile of the FIG. 16*a* battery.

FIG. 16(a) shows the cyclic stability of a 5 mg electrode cycled at 60° C. with a current of 144 µA, the electrode exhibits an initial discharge of 320 mAh $g^{-1}$ or 1020 mAh $g^{-1}$ based only on the mass fraction of the FeS+S nano-composite active material. The theoretical capacity of FeS+S should only be approximately 900 mAh $g^{-1}$ however, the other iron deficient phases present in the FeS precursor affect the actual theoretical value. After the initial discharge, the electrode rapidly gains capacity until a maximum capacity of 550 mAh $g^{-1}$ and maximum energy density of 1040 Wh $kg^{-1}$ are achieved by the $16^{th}$ cycle. This maximum is followed by an extended phase of capacity fade until the electrode's capacity stabilizes at 330 mAh $g^{-1}$ by the sixty-eighth cycle. The initial discharge and the one-hundred-fiftieth cycle both exhibit a specific capacity of very nearly 320 mAh $g^{-1}$ yet the energy densities of these cycles are 470 and 600 Wh $kg^{-1}$, respectively. The discrepancy in energy densities despite similar specific capacities is a reflection of voltage profile evolution to higher potentials. FIGS. 16(b-e) present the voltage profiles of the first and second, tenth and twentieth, thirtieth and fortieth, and sixtieth and one-hundred-fiftieth cycles, respectively.

Voltage profile evolution can be correlated to the rise, fade and stabilization of the electrode's capacity. To understand the behavior of the FeS+S electrode, dQ/dV analysis was employed to qualitatively identify parallel redox chemistries. FIG. 17 shows (a) dQ/dV profiles for bulk-type all-solid-state Li metal batteries with FeS, syn-$FeS_2$, and S composite cathodes; and (b)-(e) dQ/dV profiles for cycles 1, 2, 10, 20, 30, 40, 60 and 150 of an example FeS+S/Li battery. It is observed that the evolution of three parallel redox chemistries accounts for the changing capacity of the battery. Twinning of reduction peaks in voltage ranges between 2.13-2.19 and 1.56 - 1.51 V provides evidence for the in-situ electrochemical formation of a $FeS_2$ phase.

Figure 17A:
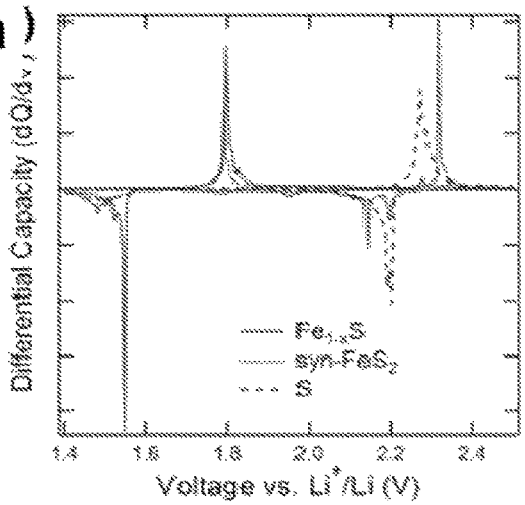
FIG. 17*a* shows dQ/dV profiles for bulk-type all-solid-state Li metal batteries.
Figure 17B:
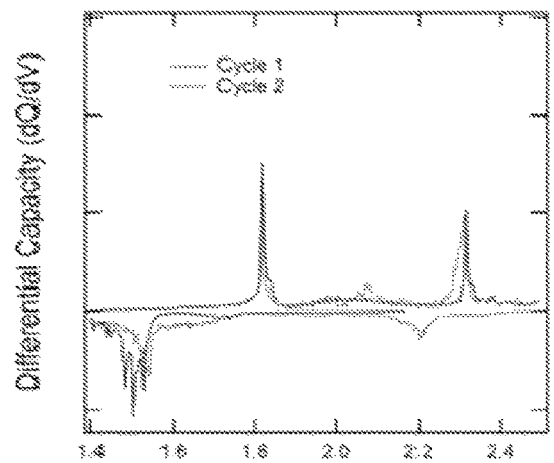
FIG. 17*b* shows a dQ/dV profile of an example battery.
Figure 17C:
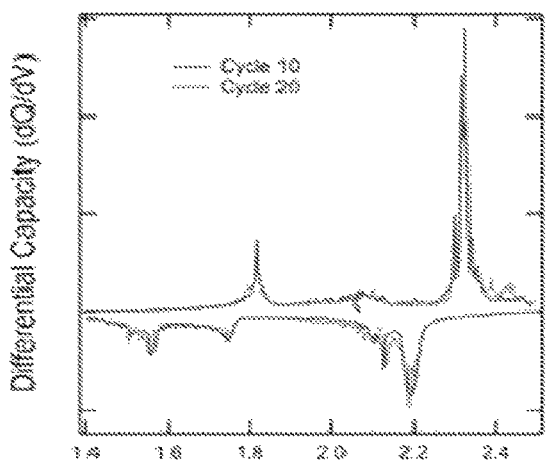
FIG. 17*c* shows a dQ/dV profile of an example battery.
Figure 17D:
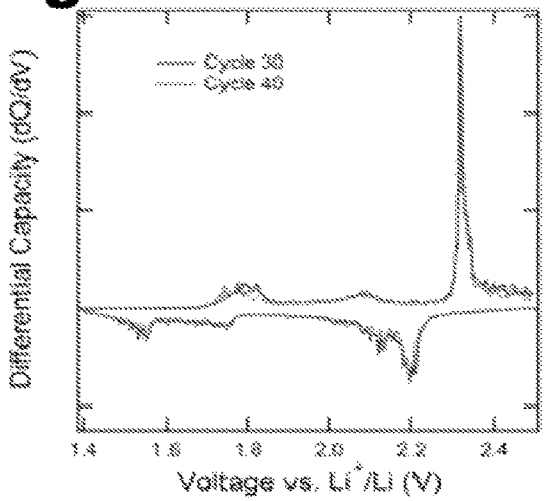
FIG. 17*d* shows a dQ/dV profile of an example battery.
Figure 17E:
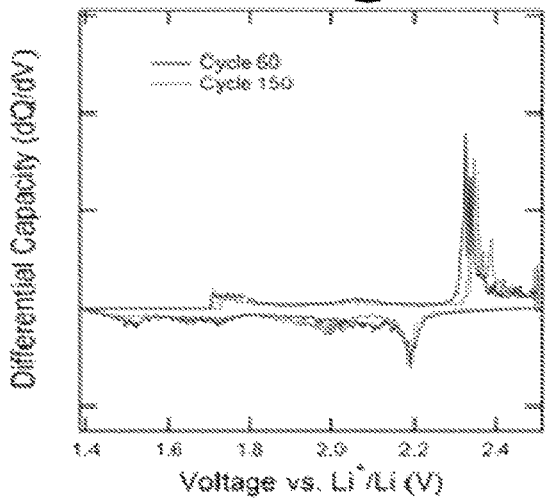
FIG. 17e shows a dQ/dV profile of an example battery.

FIG. 17a shows the characteristic behavior of FeS, $FeS_2$, and S in an ASSLB. The $FeS_2$ chemistry is characterized by dominant reduction peaks at 2.20, 2.14 and 1.49 V, while S is characterized by a reduction peak at 2.2V and FeS by a peak at 1.55V. The dQ/dV profiles in FIG. 17b for the first and second cycles show evidence for the reduction of only FeS and S. As the cell's capacity increases, so too does the complexity of the voltage profiles. By the tenth and twentieth cycle, the dQ/dV profiles in FIG. 17c show evidence for the reduction of FeS, S and $FeS_2$. The reduction of $FeS_2$ is apparent due to the twinning of reduction peaks in voltage ranges of 2.14-2.19 V and 1.51-1.56 V. This is the first time evidence for the in-situ electrochemical formation of $FeS_2$ has been presented.

Next, capacity fade is correlated to the decline of peaks associated with $Fe^0 \leftrightarrows Fe^{2+}$ reduction and oxidation. The dQ/dV profiles in FIG. 17d for the thirtieth and fortieth cycles during the capacity fade phase show that Fe redox peaks disappear while the S redox peaks remain relatively stable. By the sixtieth cycle the dQ/dV profiles in FIG. 17e for the electrode achieve a degree of stability. Extended cycling capacity loss is associated with continued fade of the Fe redox peaks and the fade of S redox peaks.

The electrochemical utilization of the $77.5Li_2S:22.5P_2S_5$ glass electrolyte can be understood with reference to ex-situ XRD measurement of FeS based electrodes. In this example, FeS was used instead of FeS+S to simplify the analysis. A glass electrolyte was used because the absence of ceramic electrolyte diffraction patterns also simplifies the analysis. To mimic the nano-size morphology of the FeS+S active material, the FeS used in this experiment was mechanically milled.

FIG. 18 shows (a) XRD of FeS before and after milling indicates that no phase changes occur during milling, (b) an FESEM micrograph of FeS as received from the vendor, and (c) an FESEM micrograph of $Fe_{1-x}S$ after mechanical milling. The XRD and FESEM analysis confirm that the mechanical milting provides the needed size reduction. Utilization of nano-FeS helps obtain good contact with the glass electrolyte.

Figure 19A:
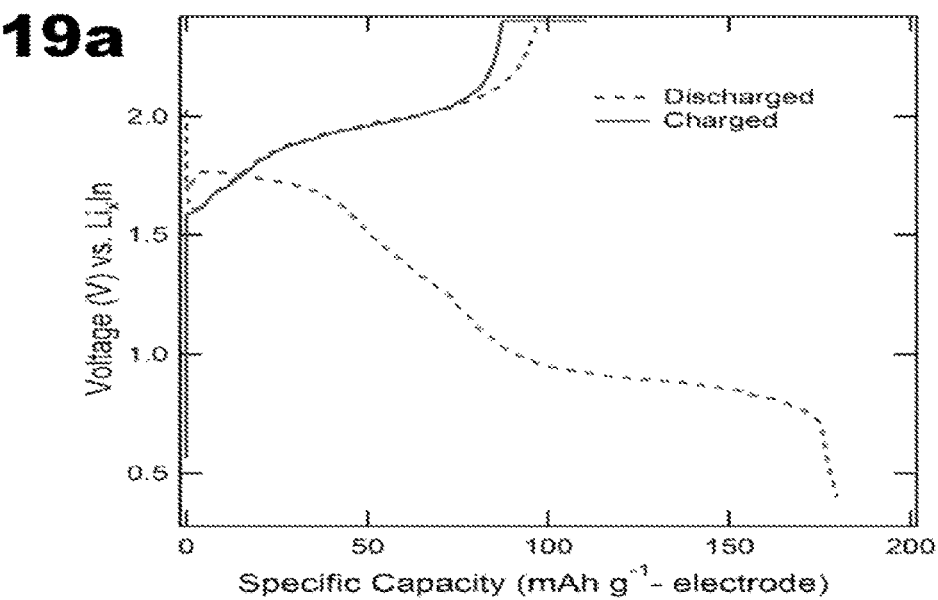
FIG. 19a shows voltage profiles for two initially overcharged FeS/LiIn batteries.

FIG. 19(a) shows voltage profiles for two initially overcharged FeS/LiIn batteries. Composite electrodes were collected for XRD after full overcharge (solid) and full discharge (dashed). As seen in FIG. 19(a), the FeS composite electrode was recovered after an initial overcharge (solid) and after full discharge (dashed) (FIG. 4a).

Figure 19B:
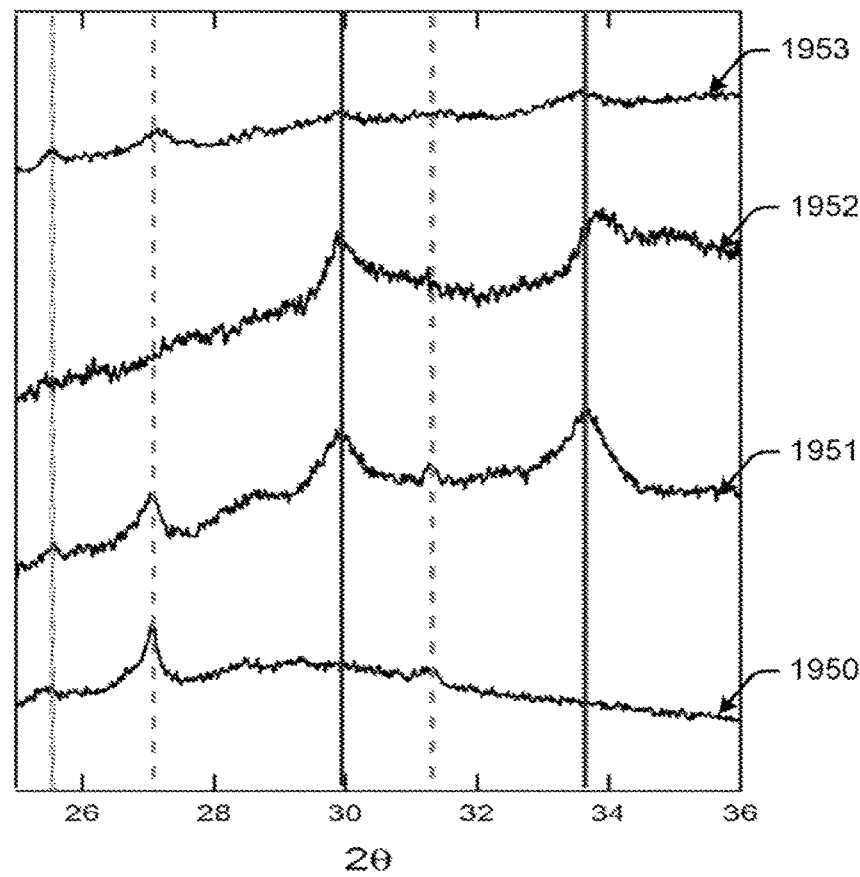
FIG. 19b shows XRD measurements normalized with the (100) reflection of the beta-Be sample window.

In FIG. 19(b), all XRD measurements are normalized with the (100) reflection of the beta-Be sample window (dotted). $Li_3S$ reflections are indicated by the dashed lines while $Fe_{1-x}S$ reflections are indicated by the solid lines. The XRD sample cycled to an initial full discharge exhibits a low capacity because the electrode composite was mixed manually and not mechanically. Because FeS is already in the fully charged state, these cells should have exhibited zero charge capacity. Instead, both cells achieve an overcharge capacity of about 100 mAh It can be seen from the XRD of cycled FeS composite electrodes in FIG. 19(b), that this capacity is associated with the utilization of excess $Li_2S$ in the glass electrolyte component of the composite electrode. The diffraction pattern for the glass electrolyte 1950 includes reflections for $Li_2S$ (dashed). As expected, the diffraction pattern for an uncycled composite electrode 1951 includes reflections for $Li_2S$ and FeS (solid). After an initial overcharge 1952, the reflections for $Li_2S$ disappear. When an electrode is discharged after an initial overcharge 1953, reflections for FeS disappear and weak reflections for $Li_2S$ are once again detected. The reduced intensity of the $Li_2S$ reflections in this sample is believed to be due to the small size of electrochemically precipitated $Li_2S$ particles.

To determine how reasonable it is to attribute the excess capacity to the utilization of excess $Li_2S$ in the glass electrolyte, the percentage of $Li_2S$ oxidized in the cell presented in FIGS. 16(a-e) and 17(a-e) can be estimated by assuming that all of the FeS+S was electrochemically utilized and by acknowledging that the highest achieved capacity is 2.8 mAh. A fraction of this capacity can be attributed to utilization of the glass electrolyte at the electrode/glass electrolyte separator interface, as indicated by FIG. 21(a-b).

Figure 20:
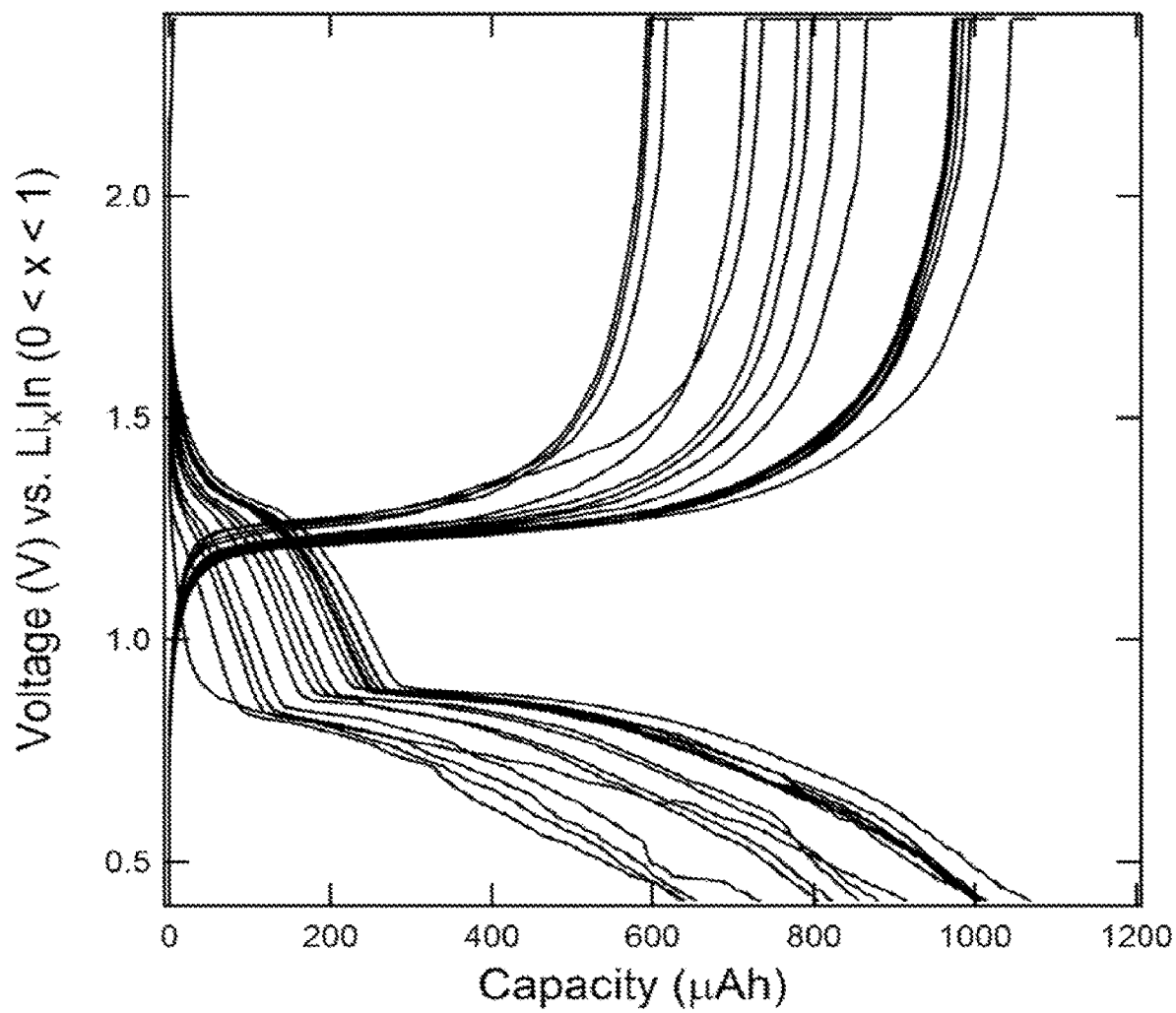
FIG. 20 shows voltage profiles of a FeS/LiIn battery.

FIG. 20 shows the first through seventeenth voltage profiles of a FeS/LiIn battery where the cathode is composed entirely of 5 mg of nano-FeS. Normally, FeS should reversibly exhibit only a single plateau. However, with cycling, this battery develops a higher voltage plateau at approximately 1.4 V versus. InLi. The evolution of the second plateau can be attributed to the electrochemical utilization of $Li_2S$ in the glass electrolyte at the electrode/glass electrolyte separator interface. By the seventeenth cycle, up to 300 µAh of capacity can be attributed to the utilization of glass electrolyte separator. This interface utilization effect may lead to an overestimation of specific capacity and contribute to the observed excess capacity.

Utilization of the glass electrolyte separator may lead to an overestimation of specific capacity and contribute to the observed excess capacity especially when the electrode is very small like it is in this case. The FeS+S component can account for 1.45 mAh of the maximum capacity. Without accounting for utilization of the glass electrolyte separator, the remaining capacity indicates that 1.16 mg, or 86%, of $Li_2S$ in the glass electrolyte is electrochemically utilized, Such a large percentage of the $Li_2S$ component is likely not oxidized without decreasing the ionic transport of the composite electrode. Yet, a rate test at 60° C. was conducted on another FeS+S electrode after a five cycle activation and good performance was observed.

Figure 21B:
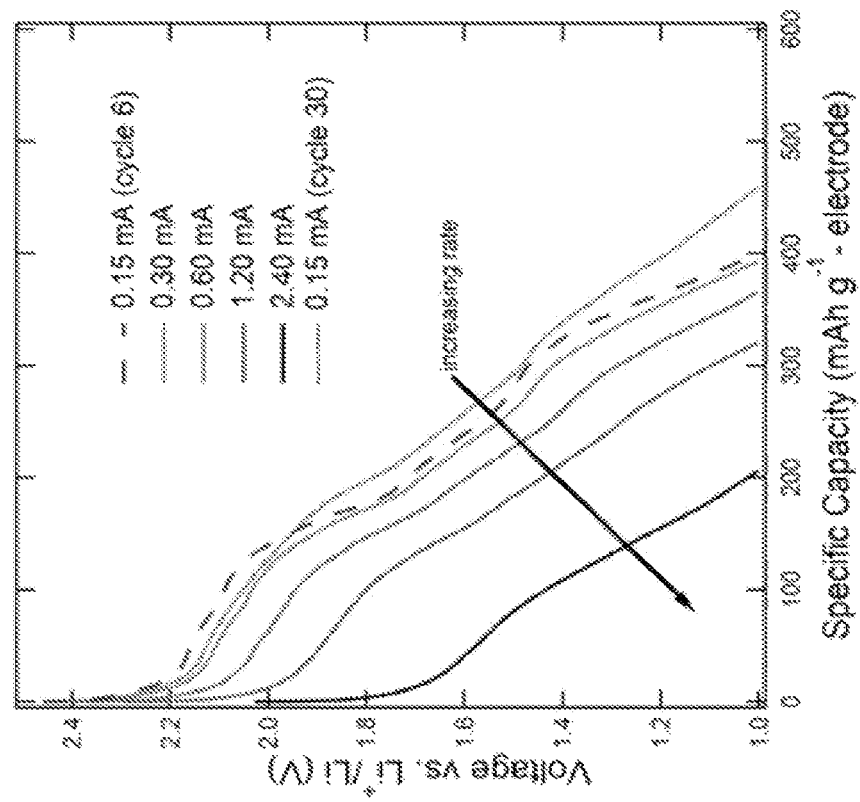
FIG. 21b shows voltage profiles of the same battery as a function of applied current.
Figure 21A:
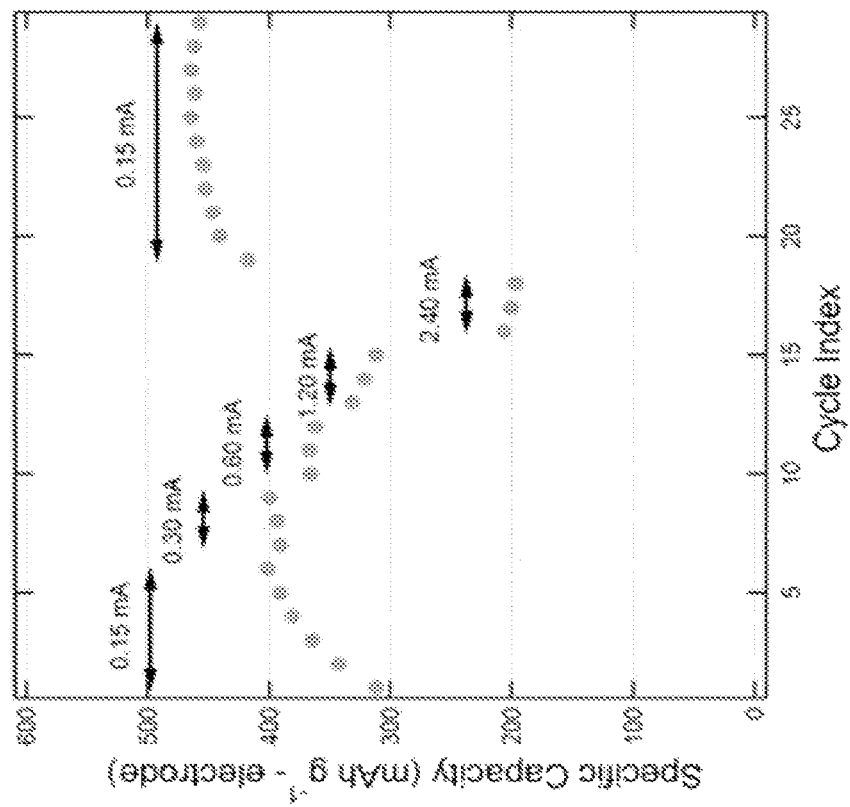
FIG. 21a shows specific discharge capacity of a battery as a function of applied current.

FIG. 21 shows (a) specific discharge capacity of a battery as a function of applied current, and (b) voltage profiles of the same battery as a function of applied current. The electrode maintains a specific capacity of 200 mAh $g^{-1}$ with an applied current of about 2.40 mA. To maintain good ionic transport, it is likely that the $P_2S_5$ component of the glass electrolyte may be electrochemically utilized as well. Utilization of $P_2S_5$ also explains why capacity increases during discharge cycles, and not only during the charge cycles when excess $Li_2S$ is initially oxidized to S.

It is noted that while the initial specific discharge capacity of the cell presented in FIGS. 16(a-e) and 17(a-e) is similar to that presented in FIG. 20, the degree and rate of capacity activation of each cell is much different. By the fifth cycle the first cell exhibits a specific capacity of about 488 mAh $g^{-1}$ while the cell used in the rate test only exhibits a specific capacity of about 400 mAh $g^{-1}$. The maximum capacity of the rate cell is also about 15% lower than that achieved by the first cell.

The electrodes for these two samples were prepared separately which attests to the sensitivity of electrolyte activation to the quality of the glass electrolyte. Electrolyte sensitivity is emphasized by the results of another study that did not observe electrolyte utilization. Like this study, nano-FeS was used as an active material and $Li_2S$ was a precursor for their electrolyte. However, the electrolyte was a different composition, thio-LISICON $Li_{3.25}Ge_{0.25}P0_{0.75}S_4$, and was prepared by melt quenching instead of mechanochemical milling. Previous work also did not show evidence for electrochemical activation of the glass electrolyte. In this study, three 5 micron cubes of synthetic $FeS_2$ were used as the active material. Such a large particle size results in poor contact between the glass electrolyte and the active material which may inhibit electrolyte utilization. Cubic-$FeS_2$ is also a semiconductor with a much lower electronic conductivity than that of the ferrimagnetic $Fe_{1-x}S$ precursor used in this study.

It is noted that the decision to mechanically combine µm-Cu powder with S or $Li_2S$ can be further improved. For example, the conversion materials, $FeF_2$ and $CuF_2$ suggest that a nano-structured network of reduced metallic nanoparticles may be employed for good reversibility. A mechanical mixture with micron active metal particles is therefore not ideal for good reversibility or for good electrolyte utilization. Instead, electrochemically reduced nano-active metal particles may be used due to the better atomic proximity to other reduced species, as well as to the electrolyte particles, to further enhance reversibility and effective electrolyte utilization.

The examples shown and described herein are provided for purposes of illustration and are not intended to be limiting. Still other examples are also contemplated.

What is claimed is:

1. A battery comprising a composite cathode, the composite cathode including:

a solid-state electrolyte;

an iron sulfide compound; and
a sulfur source made to be electrochemically active by its proximity to the iron sulfide compound and the compound's charge and discharge products.

2. The battery of claim 1, wherein the solid-state electrolyte is sulfide-based.

3. The battery of claim 1, wherein the iron sulfide compound comprises at least one of FeS or $FeS_2$.

4. The battery of claim 1, wherein the sulfur source comprises $Li_2S$ or S.

5. The battery of claim 1, wherein the sulfur source is present within a solid electrolyte material.

6. The battery of claim 1, wherein the composite cathode further includes an electronic conductive additive.

7. The battery of claim 6, wherein the electronic conductive additive is carbon or a mixed ionic-electronic conductive additive or a combination of the two additive types.

8. The battery of claim 7, wherein the mixed ionic-electronic conductive additive is $TiS_2$.

9. The battery of claim 1 further comprising an anode and a solid-state electrolyte layer between the composite cathode and the anode.

10. The battery of claim 1, further comprising an anode including lithium metal, carbon, or silicon-based active materials.

* * * * *